(12) United States Patent
Miyashita

(10) Patent No.: US 7,000,385 B2
(45) Date of Patent: Feb. 21, 2006

(54) EXHAUST GAS PURIFICATION APPARATUS AND METHOD FOR INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 117 days.

(21) Appl. No.: 10/717,564

(22) Filed: Nov. 21, 2003

(65) Prior Publication Data

US 2004/0103650 A1 Jun. 3, 2004

(30) Foreign Application Priority Data

Nov. 29, 2002 (JP) ............................. 2002-347256

(51) Int. Cl.
*F01N 3/00* (2006.01)
(52) U.S. Cl. ...................... 60/295; 60/274; 60/285; 60/297; 60/301
(58) Field of Classification Search .................. 60/274, 60/277, 285, 286, 295, 297, 301
See application file for complete search history.

(56) References Cited

U.S. PATENT DOCUMENTS

| | | | | |
|---|---|---|---|---|
| 5,412,945 | A * | 5/1995 | Katoh et al. .................. 60/285 |
| 5,437,153 | A * | 8/1995 | Takeshima et al. ........... 60/276 |
| 5,715,679 | A | 2/1998 | Asanuma et al. | |
| 5,894,725 | A * | 4/1999 | Cullen et al. .................. 60/274 |
| 6,195,987 | B1 * | 3/2001 | Miyashita ..................... 60/285 |
| 6,477,834 | B1 * | 11/2002 | Asanuma et al. ............. 60/295 |
| 6,650,991 | B1 * | 11/2003 | Farmer et al. ............... 701/104 |
| 6,860,101 | B1 * | 3/2005 | Kako et al. .................... 60/285 |

FOREIGN PATENT DOCUMENTS

| | | |
|---|---|---|
| DE | 19929 292 A1 | 5/1995 |
| DE | 199 29 293 A1 | 12/2000 |
| EP | 0 733 787 A | 9/1996 |
| JP | A 7-139340 | 5/1995 |

OTHER PUBLICATIONS

U.S. Appl. No. 10/266,582, filed Oct. 9, 2002, Kako et al.

* cited by examiner

*Primary Examiner*—Binh Q. Tran
(74) *Attorney, Agent, or Firm*—Oliff & Berridge, PLC

(57) ABSTRACT

An exhaust passageway of an engine is provided with a NOx storage-reduction catalyst for trapping and storing NOx from an exhaust gas lean of a stoichiometric air-fuel ratio. When the storage of the NOx in the catalyst becomes large, the engine is operated at a rich air-fuel ratio for a short time so that NOx is released from the catalyst and is removed by reduction. An electronic control unit of the engine estimates the amount of storage of NOx in the catalyst through the use of NOx counters that are incremented at a predetermined rate during a lean air-fuel ratio operation of the engine, and that are decremented at a predetermined rate during a rich air-fuel ratio operation of the engine. Independent NOx counters are provided for at least two divided portions of the catalyst in a one-to-one correspondence. By setting the incrementing and decrementing rates of each NOx counter in accordance with the NOx trapping-releasing characteristic of a corresponding one of the portions of the catalyst, it becomes possible to accurately estimate the storage of NOx in the catalyst.

24 Claims, 8 Drawing Sheets

EXHAUST GAS PURIFICATION APPARATUS AND METHOD FOR INTERNAL COMBUSTION ENGINE

INCORPORATION BY REFERENCE

The disclosure of Japanese Patent Applications No. 2002-347256 filed on Nov. 29, 2002, including its specification, drawings and abstract, is incorporated herein by reference in its entirety.

BACKGROUND OF THE INVENTION

1. Field of the Invention

The invention relates to an exhaust gas purification apparatus and method for an internal combustion engine and, more particularly, to an exhaust gas purification apparatus and method for an internal combustion engine equipped with a NOx storage-reduction catalyst.

2. Description of the Related Art

There are known exhaust gas purification apparatuses for internal combustion engines in which an exhaust passageway is provided with a NOx storage-reduction catalyst that selectively traps and stores NOx from incoming exhaust gas by adsorption or absorption, or both, when the air-fuel ratio of the exhaust gas is on the fuel-lean side of stoichiometry, and that releases stored NOx and removes the NOx through reduction when the air-fuel ratio of incoming exhaust gas becomes stoichiometric or rich of stoichiometry, so that NOx present in exhaust gas during a lean air-fuel ratio operation of the engine is trapped and stored into the NOx storage-reduction catalyst and therefore emission of NOx into the atmosphere is prevented.

As the amount of storage of NOx in the NOx storage-reduction catalyst increases, the NOx trapping capability of the catalyst decreases, and the proportion of NOx that is not trapped into the catalyst but passes through the catalyst increases. Furthermore, if the storage of NOx in the NOx storage-reduction catalyst reaches a maximum amount that is storable in the catalyst, the NOx storage-reduction catalyst becomes unable to store any more NOx from exhaust gas, so that the entire amount of NOx present in exhaust gas passes through the catalyst.

Therefore, in exhaust gas purification apparatuses employing a NOx storage-reduction catalyst, a regeneration operation (rich-spike operation) of operating the engine at a rich air-fuel ratio is performed when the storage of NOx in the NOx storage-reduction catalyst increases to a certain amount. By executing the regeneration operation, a rich air-fuel ratio exhaust gas is supplied to the NOx storage-reduction catalyst, so that NOx is released from the NOx storage-reduction catalyst, and is removed through the reduction by unburned hydrocarbon, CO, etc., that are present in the rich air-fuel ratio exhaust gas. Therefore, the storage of NOx in the NOx storage-reduction catalyst reduces, and the NOx trapping capability of the NOx storage-reduction catalyst is recovered.

The regeneration operation (rich-spike operation) needs to be appropriately performed in accordance with the amount of NOx stored in the NOx storage-reduction catalyst, as indicated above. For example, if the regeneration operation is performed when the NOx storage-reduction catalyst stores only a small amount of NOx and retains a good trapping capability, increased frequency of performing the engine operation with a rich air-fuel ratio will result, so that the property of exhaust gas may degrade or the fuel consumption may increase. Conversely, if the frequency of performing the regeneration process is lower than necessary, the storage of NOx in the NOx storage-reduction catalyst will increase beyond an allowable limit, so that the NOx trapping capability of the catalyst may drop and the property of exhaust gas may degrade. Therefore, in order to appropriately perform the rich-spike operation, it is necessary to accurately find the amount of NOx stored in the NOx storage-reduction catalyst. However, in reality, it is difficult to directly measure the amount of NOx stored in the NOx storage-reduction catalyst during operation of the engine. Therefore, various methods for estimating the amount of storage of NOx in the NOx storage-reduction catalyst instead of direct measurement have been proposed.

For example, a known method for accurately estimating the amount of NOx stored in the NOx storage-reduction catalyst uses a NOx counter (Japanese Patent Application Laid-Open Publication No. 7-139340). The NOx counter is a counter value that is incremented or decremented in accordance with the state of operation of the engine all the time during the engine operation so that the value corresponds to the amount of NOx stored in the NOx storage-reduction catalyst. In an exhaust gas purification apparatus disclosed in Japanese Patent Application Laid-Open Publication No. 7-139340, during lean air-fuel ratio operation of the engine, an amount determined in accordance with the state of operation of the engine is added to the NOx counter at constant time intervals. During operation of the engine at the stoichiometric air-fuel ratio or rich air-fuel ratio, an amount determined in accordance with, for example, the air-fuel ratio of the engine, the temperature of the NOx storage-reduction catalyst, etc., is subtracted from the NOx counter at constant time intervals. In this manner, the value of the NOx counter is changed so as to always correspond to the present amount of storage of NOx in the NOx storage-reduction catalyst.

Specifically, the amount of NOx discharged from an engine in a unit time during operation of the engine is determined in accordance with engine operation conditions, such as engine load, engine speed, etc. It is considered that during the lean air-fuel ratio operation of the engine, a certain proportion of the NOx discharged from the engine is trapped and stored into the NOx storage-reduction catalyst. Therefore, during the lean air-fuel ratio operation, the storage of NOx in the NOx storage-reduction catalyst is considered to increase, in a unit time, by an amount obtained by multiplying the amount of NOx produced from the engine by the predetermined proportion.

During the stoichiometric or rich air-fuel ratio operation of the engine, the NOx stored in the NOx storage-reduction catalyst is released from the catalyst at a predetermined rate, and is removed through reduction. The amount of NOx released from the NOx storage-reduction catalyst in a unit time, that is, the amount of decrease in the storage of NOx per unit time, is considered to be proportional to the amount of inflow of unburned fuel, CO, and the like to the NOx storage-reduction catalyst.

In the apparatus disclosed in Japanese Patent Application Laid-Open Publication No. 7-139340, the value of the NOx counter is controlled so as to accurately correspond to the present amount of storage of NOx in the NOx storage-reduction catalyst all the time during operation of the engine by increasing the NOx counter at a rate corresponding to the increase in the storage of NOx in the catalyst during the lean air-fuel ratio engine operation and by decreasing the NOx counter at a rate corresponding to the decrease in the storage of NOx in the catalyst during the stoichiometric or rich air-fuel ratio engine operation.

The apparatus disclosed in Japanese Patent Application Laid-Open Publication No. 7-139340 accurately estimates the amount of NOx stored in the NOx storage-reduction catalyst through the use of the NOx counter value acquired as described above, thereby allowing appropriate execution of the rich-spike operation.

It should be possible to precisely execute the rich-spike operation by estimating the amount of NOx stored in the NOx storage-reduction catalyst through the use of the NOx counter as in Japanese Patent Application Laid-Open Publication No. 7-139340. However, in reality, if the rich-spike operation is executed only on the basis of the storage of NOx estimated through the use of the NOx counter as in Japanese Patent Application Laid-Open Publication No. 7-139340, there may arise a problem of the NOx storage-reduction catalyst failing to sufficiently recover the NOx trapping capability despite execution of the rich-spike operation.

The NOx storage-reduction catalyst traps and stores NOx from exhaust gas and releases NOx in accordance with the change in air-fuel ratio between the lean side and the rich side of stoichiometry. However, in reality, the rates of trap and release of NOx are not uniform over the entire body of the NOx storage-reduction catalyst, but greatly vary depending on locations in the catalyst. For example, when NOx is trapped and stored during the lean air-fuel ratio operation of the engine, most NOx is initially stored in an upstream-side portion of the NOx storage-reduction catalyst, and substantially no NOx reaches a downstream-side portion of the catalyst. Therefore, during a certain time following the beginning of the lean air-fuel ratio engine operation, NOx is unlikely to be stored in a downstream-side portion of the catalyst. Similarly, during the regeneration operation, the release of NOx from the catalyst initially occurs at the upstream side, and therefore the consumption of unburned hydrocarbons and the like contained in exhaust gas initially occurs in a region near the upstream side of the catalyst. Hence, during an early period of the regeneration operation, the release of NOx is unlikely to occur in a portion of the catalyst near the downstream side.

Thus, the upstream-side portion and the downstream-side portion of the NOx storage-reduction catalyst have greatly different rates of storage and release of NOx. In general, the storage/release of NOx initially occurs in an upstream-side portion of the catalyst, and then occurs in a downstream-side portion after the elapse of a delay time. In this manner, the characteristics (rate and timing) of storage and release of NOx are greatly different between the upstream-side portion and the downstream-side portion of the NOx storage-reduction catalyst. Similar to the differences between the upstream-side portion and the downstream-side portion of the catalyst, differences in the NOx storage and release characteristics exist between an upper coat layer portion and a lower coat layer portion of the catalyst.

The apparatus disclosed in Japanese Patent Application Laid-Open Publication No. 7-139340 estimates the amount of storage of NOx in the NOx storage-reduction catalyst by using fixed rates of storage and release of NOx although the NOx storage/release characteristics vary depending on locations in the catalyst. Therefore, errors may occur in the estimation of the storage of NOx in the catalyst. For example, if the fixed values of the NOx storage/release rates adopted in the apparatus are close to the values of the rates of an upstream-side portion of the catalyst, the rich-spike operation for the NOx storage-reduction catalyst is ended on the basis of a determination that the release of NOx is completed, while a downstream-side portion of the catalyst has not even started to release NOx or still stores some NOx although the portion has started releasing NOx. As a result, some NOx is left in the downstream-side portion of the catalyst when the trapping and storing of NOx into the catalyst is restarted. In this manner, the storage of NOx in the downstream-side portion of the NOx storage-reduction catalyst gradually increases, resulting in a problem of a considerable drop in the trapping capability of the portion of the catalyst despite execution of the rich-spike operation based on the amount of storage of NOx estimated through the use of the NOx counter.

While the above-description is made in conjunction with NOx, SOx (oxides of sulfur) can also be trapped, if contained in exhaust gas, by the NOx storage-reduction catalyst substantially in the same fashion as NOx when the air-fuel ratio is lean of stoichiometry. The storage of SOx in the NOx storage-reduction catalyst decreases the NOx trapping capability of the catalyst as is the case with the storage of NOx. Therefore, if SOx is stored in the catalyst, it is necessary to execute a regeneration operation similar to the above-described rich-spike operation in order to recover the NOx trapping capability of the NOx storage-reduction catalyst. The generation operation for releasing SOx from the NOx storage-reduction catalyst requires that the air-fuel ratio of exhaust gas entering the catalyst be maintained on the rich side of stoichiometry as in the above-described rich-spike operation, and the exhaust gas temperature be raised higher than the temperature for the rich-spike operation for releasing NOx. Therefore, in order to fully utilize the trapping capability of the NOx storage-reduction catalyst, it is necessary to accurately estimate the amount of SOx stored in the catalyst and execute an appropriate regeneration operation for releasing SOx as in the case of NOx.

SUMMARY OF THE INVENTION

It is an object of the invention to provide an exhaust gas purification apparatus and method for an internal combustion engine that allows effective use of the trapping capability of a NOx storage-reduction catalyst by preventing an error in estimation of the amount of storage of NOx or SOx in the NOx storage-reduction catalyst and therefore achieving accurate estimation of the NOx or SOx storage.

In accordance with a first aspect of the invention, an exhaust gas purification apparatus for an internal combustion engine includes a NOx storage-reduction catalyst which is disposed in an exhaust passageway of the internal combustion engine, and which selectively traps and stores a specific component that includes at least one of nitrogen oxides (NOx) and sulfur oxides (SOx) from an exhaust gas coming into the NOx storage-reduction catalyst by at least one of adsorption and absorption when the exhaust gas coming into the catalyst has an air-fuel ratio lean of stoichiometry, and which releases the specific component stored and removes the specific component through reduction when the exhaust gas coming into the catalyst has a stoichiometric or rich-of-stoichiometry air-fuel ratio. The apparatus further includes a estimation device that estimates an amount of storage of the specific component in the NOx storage-reduction catalyst and an amount of release of the specific component from the NOx storage-reduction catalyst, and a regeneration device that performs a regeneration operation of releasing the specific component stored in the NOx storage-reduction catalyst and removing the specific component through reduction by supplying a rich-of-stoichiometry exhaust gas to the NOx storage-reduction catalyst based on the amount of storage of the specific component estimated by the estimation device. The estimation device estimates the amount of storage of the specific component and the amount of release of the specific component with respect to each one of at least two different portions of the NOx storage-reduction catalyst.

That is, in the first aspect of the invention, the estimation device estimates the amount of storage of the specific component (NOx or SOx) and the amount of release of the specific component with respect to each one of the at least two divided portions of the NOx storage-reduction catalyst. Therefore, it becomes possible to estimate the amount of NOx or SOx stored in or released from portions of the NOx storage-reduction catalyst which have different characteristics of trapping and reieasing NOx or SOx, for example, an upstream side portion and a downstream side portion of the catalyst, and the like, on the basis of their respective NOx or SOx trapping-releasing characteristics. Hence, errors in estimated values of the storage of NOx or SOx in the NOx storage-reduction catalyst due to the different trapping-releasing characteristics of the portions of the catalyst will be avoided.

In a second aspect of the invention based on the above-described first aspect, the estimation device may indicate the amount of storage of the specific component in each portion of the NOx storage-reduction catalyst by using a storage counter, and may estimate the amount of storage of the specific component in each portion of the NOx storage-reduction catalyst by incrementing the storage counter at a rate proportional to a concentration of the specific component in the exhaust gas coming into the NOx storage-reduction catalyst when the exhaust gas coming into the catalyst has an air-fuel ratio lean of stoichiometry, and decrementing the storage counter at a predetermined rate when the exhaust gas coming into the catalyst has a stoichiometric or rich-of-stoichiometry air-fuel ratio.

That is, the estimation device estimates the amounts of storage of NOx or SOx in the portions of the NOx storage-reduction catalyst by using storage counters. Since the storage counters are provided separately for the individual portions of the catalyst and the incrementing rate and the decrementing rate of each storage counter are set on the basis of the NOx or SOx trapping-releasing characteristic of a corresponding one of the portions of the catalyst, an error in estimation of the storage of NOx or SOx in the NOx storage-reduction catalyst is avoided.

In a third aspect of the invention based on the first aspect, the estimation device may estimate the amount of storage of the specific component in each portion of the NOx storage-reduction catalyst by distributing an entire amount of the specific component storable in the NOx storage-reduction catalyst to the at least two portions of the NOx storage-reduction catalyst at a predetermined distribution ratio while the NOx storage-reduction catalyst is trapping and storing the specific component.

That is, the estimation device estimates the amount of NOx or SOx stored in each portion of the NOx storage-reduction catalyst by distributing the entire amount of NOx or SOx storable in the catalyst to the portions of the catalyst at a predetermined distribution ratio. The distribution ratio may be determined in accordance with the NOx or SOx trapping characteristics of the portions of the catalyst, for example, the NOx trapping rates of the portions, or the like. Therefore, it becomes possible to accurately estimate the amount of NOx or SOx stored in each portion of the NOx storage-reduction catalyst. Thus, occurrence of an error in estimation of the storage of NOx or SOx in the catalyst will be avoided.

In a fourth aspect of the invention based on the first aspect, the estimation device may estimate the amount of storage of the specific component in each portion of the NOx storage-reduction catalyst by determining the amount of release of the specific component from each portion of the NOx storage-reduction catalyst during the regeneration operation for the NOx storage-reduction catalyst.

That is, the estimation device separately determines the amount of NOx or SOx released from and reduced on each portion of the NOx storage-reduction catalyst during the regeneration operation. For example, a downstream-side portion of the catalyst is less apt to release NOx or SOx during the regeneration operation than an upstream-side portion of the catalyst. That is, during the regeneration operation, the rate of release (amount of release) is smaller in the downstream-side portion of the catalyst. In the invention, the amounts of NOx or SOx released from portions of the NOx storage-reduction catalyst during the regeneration operation can be set in accordance with the NOx or SOx releasing characteristics of the individual portions of the catalyst, such as the releasing rates thereof or the like. Therefore, it becomes possible to accurately estimate the amount of storage of NOx or SOx in each portion of the NOx storage-reduction catalyst and therefore avoid occurrence of an error in estimation of the storage of NOx or SOx in the catalyst.

In the third aspect of the invention, the estimation device may set the predetermined distribution ratio in accordance with the amounts of storage of the specific component in the at least two portions of the NOx storage-reduction catalyst.

That is, the ratio regarding the storage of NOx or SOx in the portions of the NOx storage-reduction catalyst is set in accordance with the amounts of NOx or SOx stored in the portions of the catalyst. As the amount of storage of NOx or SOx in the NOx storage-reduction catalyst increases, the NOx or SOx trapping capability of the catalyst decreases, and the NOx or SOx trapping rate decreases. Since the amount of NOx or SOx storable in the entire NOx storage-reduction catalyst is distributed to the portions at a distribution ratio corresponding to the present amounts of storage of NOx or SOx in the portions of the catalyst, the amount of storage of NOx or SOx in each portion of the catalyst can be accurately estimated.

In the third aspect of the invention, the estimation device may set the predetermined distribution ratio in accordance with a degree of degradation of the NOx storage-reduction catalyst.

That is, the ratio regarding the storage of NOx or SOx in the portions of the catalyst is set in accordance with the degree of degradation of the catalyst. If the NOx storage-reduction catalyst degrades, the NOx or SOx trapping capability decreases, and the NOx or SOx trapping rate decreases. The degradation of the catalyst caused by heat or sulfur poisoning is more likely to occur in, for example, an upstream-side portion or an upper coat layer portion of the catalyst. Therefore, by setting the ratio regarding the storage of NOx or SOx in the portions of the catalyst smaller with progress of the degradation of the aforementioned portion, the amount of storage of NOx or SOx in each portion of the catalyst can be accurately estimated.

In the third aspect of the invention, the estimation device may set the predetermined distribution ratio in accordance with a temperature of the NOx storage-reduction catalyst.

That is, the ratio regarding the storage of NOx or SOx in the portions of the catalyst is set in accordance with the catalyst temperature. In general, the NOx or SOx trapping capability of the NOx storage-reduction catalyst changes with temperature. Furthermore, the catalyst temperature varies depending on portions of the catalyst. For example, the catalyst temperature is higher in an upstream-side portion than in a downstream-side portion of the catalyst. Therefore, the amount of storage of NOx or SOx in each portion of the catalyst can be accurately estimated if the ratio regarding the storage of NOx or SOx in the portions of the catalyst is increased with increasing temperature.

In the third aspect of the invention, the estimation device may set the predetermined distribution ratio in accordance with an amount of flow of exhaust gas into the NOx storage-reduction catalyst.

That is, the ratio regarding the storage of NOx or SOx in the portions of the catalyst is set in accordance with the amount of flow of exhaust gas. In general, the NOx or SOx trapping capability of the NOx storage-reduction catalyst changes with the amount of flow of exhaust gas (space velocity), and the characteristic of change in the trapping capability varies depending on portions of the catalyst. Therefore, if the ratio regarding the storage of NOx or SOx in the portions of the catalyst in accordance with the amount of flow of exhaust gas, the amount of storage of NOx or SOx in each portion of the catalyst can be accurately estimated.

In the third aspect of the invention, the estimation device may set the predetermined distribution ratio in accordance with a concentration of the specific component in an exhaust gas flowing into the NOx storage-reduction catalyst.

That is, the ratio regarding the storage of NOx or SOx in the portions of the catalyst is set in accordance with the concentration of NOx or SOx in exhaust gas. In general, the NOx or SOx trapping rate of the NOx storage-reduction catalyst changes with the concentration of NOx or SOx in exhaust gas. Furthermore, the concentration of NOx or SOx in exhaust gas is not uniform in the entire catalyst, but decreases from the upstream side to the downstream side of the catalyst. Therefore, if the ratio regarding the storage of NOx or SOx is set in accordance with the concentration of NOx or SOx in exhaust gas flowing into the NOx storage-reduction catalyst, the amount of storage of NOx or SOx in each portion of the catalyst can be accurately estimated.

In the fourth aspect of the invention, the estimation device may include an $O_2$ sensor that is disposed downstream of the NOx storage-reduction catalyst and that detects an exhaust oxygen concentration, and may estimate the amount of the specific component released from each portion of the NOx storage-reduction catalyst based on an output of the $O_2$ sensor during the regeneration operation for the NOx storage-reduction catalyst.

That is, during the regeneration operation, the amount of release of NOx or SOx from each portion of the NOx storage-reduction catalyst is set in accordance with the concentration of oxygen in exhaust gas at an outlet of the catalyst. As described in detail below, although the air-fuel ratio of exhaust flowing into the NOx storage-reduction catalyst is rich of stoichiometry during the regeneration operation for the NOx storage-reduction catalyst, the exhaust gas air-fuel ratio at the outlet of the catalyst is kept at stoichiometry while the catalyst is releasing NOx or SOx. After the release of NOx or SOx from the catalyst is completed, the exhaust gas air-fuel ratio at the outlet of the catalyst changes to the rich side of stoichiometry. However, in reality, the aforementioned release of NOx or SOx is completed only in the portion of the catalyst having high NOx or SOx trapping-releasing rate (e.g., an upstream-side portion), and the portion of the catalyst with low NOx or SOx trapping-releasing rate (e.g., a downstream-side portion) retains substantially the entire amount of NOx or SOx stored. Thus, the portion of the catalyst with low NOx or SOx trapping-releasing rate may be considered to start releasing NOx or SOx when the exhaust gas air-fuel ratio at the outlet of the catalyst changes from stoichiometry to the rich side of stoichiometry during the regeneration operation. Therefore, during the regeneration operation, the amount of storage of NOx or SOx in each portion of the catalyst can be accurately estimated if the exhaust gas air-fuel ratio at the outlet of the catalyst is monitored and, for example, the amount of storage of NOx or SOx in the portion with low NOx or SOx releasing rate is set so as to decrease with the time of continuation of a rich air-fuel ratio of exhaust gas at the outlet of the catalyst following the rich-side switch of the air-fuel ratio.

In the first aspect of the invention, the generation device may perform the regeneration operation based on a total of estimated amounts of storage of the specific component in the at least two portions of the NOx storage-reduction catalyst.

That is, the regeneration operation is performed on the basis of the total of the estimated amounts of storage of NOx or SOx in the portions of the NOx storage-reduction catalyst. For example, if the regeneration operation is performed when the total amount reaches a predetermined value, the NOx trapping capability of the NOx storage-reduction catalyst can be effectively utilized, and efficient storage and reduction of NOx or NOx can be performed.

In the first aspect of the invention, the regeneration device may determine a duration of maintaining the air-fuel ratio of the exhaust gas flowing into the NOx storage-reduction catalyst at a stoichiometric air-fuel ratio after a short time of maintaining the air-fuel ratio rich of stoichiometry during execution of the regeneration operation based on the amount of storage of the specific component in a specific portion among estimated amounts of storage of the specific component in the at least two portions of the NOx storage-reduction catalyst.

That is, the duration of maintaining the exhaust gas air-fuel ratio at stoichiometry following execution of the regeneration operation is determined in accordance with the amount of storage of NOx or SOx in a specific portion of the catalyst. For example, if the amounts of storage of NOx or SOx in the portions of the NOx storage-reduction catalyst are all zero after the maintenance of the air-fuel ratio of exhaust gas flowing into the catalyst at a rich air-fuel ratio during the regeneration operation, the duration of maintaining the exhaust gas air-fuel ratio at stoichiometry may be set at zero so as to immediately start the lean air-fuel ratio operation of the engine. However, if the lean air-fuel ratio operation of the engine is immediately started while a specific portion of the catalyst still retains NOx or SOx, there will arise a problem of increased storage of NOx or SOx in the specific portion. Therefore, it is preferable to supply a stoichiometric air-fuel ratio exhaust gas to the catalyst until NOx or SOx is completely released from the specific portion of the catalyst. Therefore, accumulation of NOx in a specific portion of the catalyst (where NOx or SOx is likely to remain) can be prevented if the duration of maintaining the exhaust gas air-fuel ratio at stoichiometry after maintaining the exhaust gas air-fuel ratio rich of stoichiometry is determined in accordance with the amount of storage of NOx or SOx in the specific portion during the regeneration operation.

In the above-described construction, the specific portion of the NOx storage-reduction catalyst may be a portion that has a lower rate of release of the specific component during execution of the regeneration operation than another portion of the NOx storage-reduction catalyst.

That is, the specific portion of the NOx storage-reduction catalyst is a portion that has a lower rate of release of the specific component than another portion of the NOx storage-reduction catalyst (e.g., an upstream-side portion or an upper coat layer portion of the catalyst). Due to the low NOx or SOx releasing rate, it is likely that the specific portion will not completely release NOx or SOx and will retain some amount of NOx or SOx when the regeneration operation is completed. Therefore, accumulation of NOx or SOx in the specific portion of the catalyst is prevented if the duration of maintaining the exhaust air-fuel ratio at stoichiometry after the regeneration operation is determined in accordance with the amount of storage of NOx or SOx in the specific portion of the catalyst.

In accordance with a fifth aspect of the invention, an exhaust gas purification method for an internal combustion engine including a NOx storage-reduction catalyst which is disposed in an exhaust passageway of the internal combustion engine, and which selectively traps and stores a specific component that includes at least one of nitrogen oxides (NOx) and sulfur oxides (SOx) from an exhaust gas coming into the NOx storage-reduction catalyst by at least one of adsorption and absorption when the exhaust gas coming into the catalyst has an air-fuel ratio lean of stoichiometry, and which releases the specific component stored and removes the specific component through reduction when the exhaust gas coming into the catalyst has a stoichiometric or rich-of-stoichiometry air-fuel ratio, the method comprising the steps of estimating an amount of storage of the specific component in the NOx storage-reduction catalyst and an amount of release of the specific component from the NOx storage-reduction catalyst, and performing a regeneration operation of releasing the specific component stored in the NOx storage-reduction catalyst and removing the specific component through reduction by supplying a rich-of-stoichiometry exhaust gas to the NOx storage-reduction catalyst based on the amount of storage of the specific component. The estimating step estimates the amount of storage of the specific component and the amount of release of the specific component with respect to each one of at least two different portions of the NOx storage-reduction catalyst.

DETAILED DESCRIPTION OF THE PREFERRED EMBODIMENTS

Figure 1:
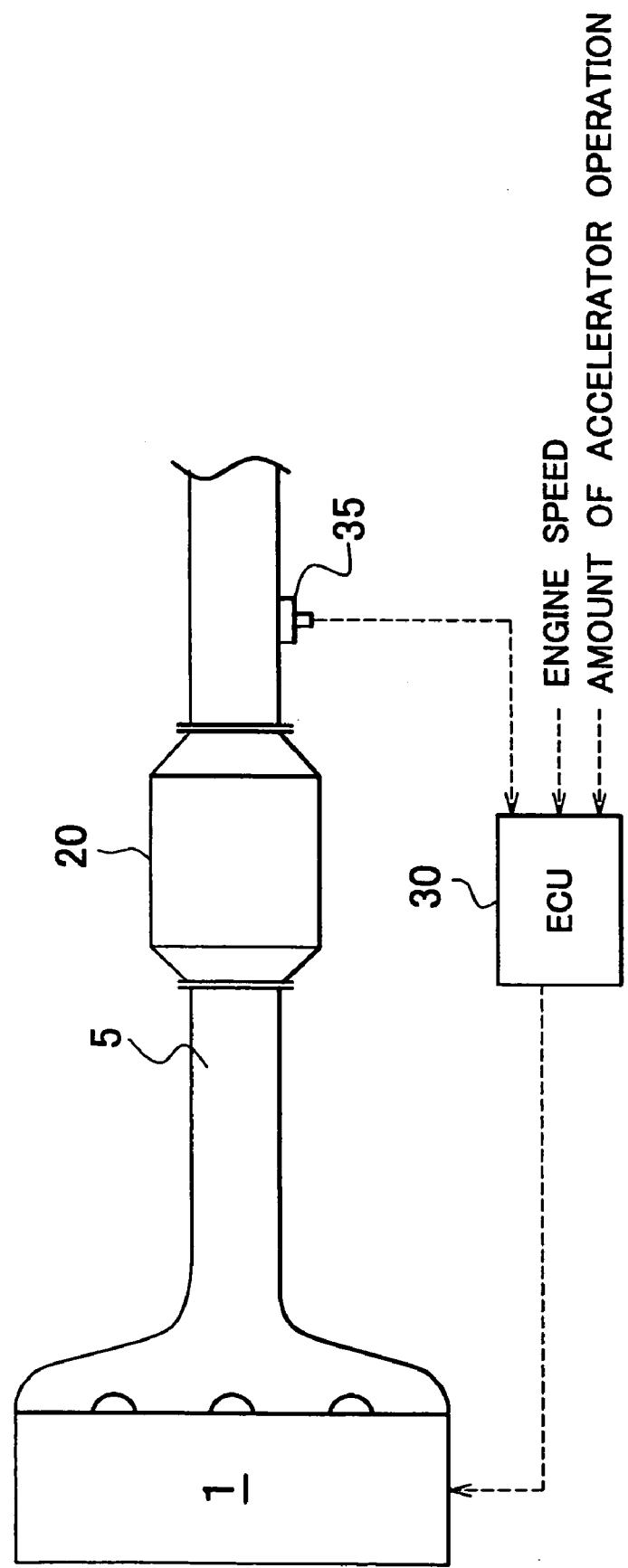
FIG. 1 is a schematic diagram illustrating the construction of an embodiment in which the invention is applied to an automotive internal combustion engine.

Embodiments of the invention will be described hereinafter with reference to the accompanying drawings. FIG. 1 shows a schematic diagram illustrating a basic overall construction of an apparatus in accordance with an embodiment to which the invention is applied to an automotive gasoline engine.

FIG. 1 shows an engine body 1 and an exhaust passageway 5. In this embodiment, the engine 1 is a generally-termed lean burn engine that is operated at an air-fuel ratio lean of stoichiometry in most portions of the operation region of the engine although the engine operation air-fuel ratio is changed in accordance with the load condition. In this embodiment, the exhaust passageway 5 is provided with a NOx storage-reduction catalyst 20. An electronic control unit (ECU) 30 of the engine 1 is formed as a known microcomputer having a RAM, a ROM, a CPU, and input-output ports. In this embodiment, the ECU 30 executes basic controls, such as a fuel injection control and an ignition timing control of the engine 1, and the like, and also performs various operations, including a regeneration operation (rich-spike operation) for the NOx storage-reduction catalyst 20 described below, an operation of estimating the amount of NOx stored (or the amount of SOx stored) in the catalyst 20, etc.

For these operations, the ECU 30 accepts input of the rotation speed of the engine 1, the amount of accelerator operation (amount of depression of an accelerator pedal (not shown)), etc., from corresponding sensors, and also accepts input of a signal corresponding to the concentration of oxygen in exhaust gas present at an outlet of the NOx storage-reduction catalyst 20 from an $O_2$ sensor 35 disposed in the exhaust passageway downstream of the NOx storage-reduction catalyst 20.

The NOx storage-reduction catalyst 20 in this embodiment is formed by loading a support of, for example, alumina, with, for example, a noble metal, such as platinum Pt or the like, and at least one element selected from the group consisting of: alkali metals, such as potassium K, sodium Na, lithium Li, cesium Cs, etc.; alkaline earths, such as barium Ba, calcium Ca, etc.; and rare earths, such as lanthanum La, cerium Ce, yttrium Y, etc. The NOx storage-reduction catalyst 20 selectively traps and stores NOx from exhaust gas by adsorption or absorption, or both, when the air-fuel ratio of exhaust gas from the engine 1 is lean of stoichiometry. When the air-fuel ratio of exhaust gas entering the catalyst becomes stoichiometric or rich of stoichiometry, the catalyst releases stored NOx and removes the NOx through the reduction by unburned hydrocarbon, CO, $CO_2$, etc. present in exhaust gas.

That is, the NOx contained in exhaust gas during a lean air-fuel ratio operation of the engine is stored in the NOx storage-reduction catalyst. Then, when the engine exhaust air-fuel ratio becomes stoichiometric or rich of stoichiometry, the NOx desorbs from the NOx storage-reduction catalyst 20, and is reduced on the NOx storage-reduction catalyst 20 by hydrocarbon, CO, etc., present in exhaust gas. Thus, NOx is removed. Therefore, emission of NOx from the engine into the atmosphere is prevented.

As the lean air-fuel ratio operation continues and therefore the storage of NOx into the NOx storage-reduction catalyst 20 continues, the amount of NOx stored in the NOx storage-reduction catalyst 20 increases. As the storage of NOx in the NOx storage-reduction catalyst increases, the NOx trapping capability of the catalyst decreases. In this specification, the proportion of the amount of NOx trapped and stored into the NOx storage-reduction catalyst of the entire amount of NOx contained in incoming exhaust gas is termed NOx trapping capability or NOx removal rate. If the NOx storage-reduction catalyst reaches a state where the catalyst has stored a maximum amount of NOx that can be stored in the catalyst (saturated state), the NOx storage-reduction catalyst 20 becomes unable to store any more NOx from exhaust gas, and the NOx removal rate of the NOx storage-reduction catalyst 20 becomes zero.

Therefore, in the embodiment, in order to prevent a drop in the NOx removal rate of the NOx storage-reduction catalyst and therefore prevent emission of NOx into the atmosphere, a rich-spike operation of switching the operation of the engine 1 from the lean air-fuel ratio operation to a rich air-fuel ratio operation for a short time is performed when the storage of NOx in the NOx storage-reduction catalyst 20 increases to a certain amount. Due to execution of the rich-spike operation, the engine exhaust air-fuel ratio is temporarily switched to a rich air-fuel ratio, that is, the oxygen concentration drops, and the amounts of unburned hydrocarbon and $CO_2$, and CO, i.e., a reducer component, increase. Therefore, NOx stored in the NOx storage-reduction catalyst is released from the catalyst, and the NOx reacts, on the catalyst, with unburned hydrocarbon, $CO_2$, and CO, i.e., a reducer component, etc., from exhaust gas, so that the NOx is reduced into $N_2$.

That is, due to execution of the rich air-fuel ratio, NOx stored in the NOx storage-reduction catalyst 20 is released from the catalyst, and therefore the storage of NOx in the catalyst 20 reduces, so that the NOx trapping capability of the catalyst 20 is recovered. In this specification, the operation of recovering the NOx trapping capability of the NOx storage-reduction catalyst by releasing NOx from the catalyst as in the rich-spike operation will be sometimes referred to as "regeneration operation".

However, as for the regeneration operation, there is a need to operate the engine at a rich air-fuel ratio for a short time in order to supply a rich air-fuel ratio exhaust gas to the NOx storage-reduction catalyst. Therefore, for example, if the regeneration operation is executed while the amount of NOx stored in the NOx storage-reduction catalyst is not large and a good NOx trapping capability remains, the frequency of execution of the regeneration operation will increase, and therefore the problem of increased fuel consumption by the engine will result, in addition to failure in full utilization of the trapping capability of the NOx storage-reduction catalyst.

If the regeneration operation is executed only after the storage of NOx in the NOx storage-reduction catalyst excessively increases, the problem of increased emission of NOx into the atmosphere will result due to an increased amount of time of operation of the engine with reduced NOx storing capability of the NOx storage-reduction catalyst. Therefore, in order to fully utilize the NOx trapping capability of the NOx storage-reduction catalyst for exhaust gas purification and therefore prevent increased consumption of fuel and degraded property of exhaust gas, it is necessary to accurately grasp the amount of storage of NOx in the NOx storage-reduction catalyst and execute the regeneration operation at an appropriate timing.

The NOx storage-reduction catalyst also traps and releases SOx in the same manner as NOx, as mentioned above. As the amount of storage of SOx in the NOx storage-reduction catalyst increases, the catalyst's capability for trapping NOx and SOx decreases. Therefore, in order to recover the NOx trapping capability, it is necessary to perform a regeneration operation similar to the regeneration operation related to NOx. The regeneration operation for releasing SOx from the catalyst is the same as the regeneration operation for releasing NOx from the catalyst, except that the SOx-releasing regeneration operation requires a longer time of supply of a rich air-fuel ratio exhaust gas to the NOx storage-reduction catalyst, and also requires a higher catalyst temperature. Therefore, as for the storage of SOx, it is necessary to accurately grasp the amount of storage of SOx in the catalyst and execute the regeneration operation at an appropriate timing as in the case of the storage of NOx. Although the following description of embodiments will be made in conjunction with the storage and release of NOx of the NOx storage-reduction catalyst, the below-described embodiments are good for SOx as well. Therefore, although in the specification, embodiments for SOx will not be described in order to avoid redundancy, it can be understood that the below-described embodiments for NOx are applicable to SOx as well by reading "NOx" as "SOx".

As described above, the apparatus disclosed in Japanese Patent Application Laid-Open Publication No. 7-139340 estimates the storage of NOx in the NOx storage-reduction catalyst through the use of the NOx counter. However, since the storage of NOx is calculated by using a single NOx counter on the assumption that the state of storage/release of NOx is uniform over the entire NOx storage-reduction catalyst regardless of locations in the catalyst, an error may occur in estimation of the amount of NOx stored in the catalyst.

This embodiment solves the aforementioned problems in the following manner. That is, the NOx storage-reduction catalyst is divided into a plurality of portions, and the individual portions are provided with NOx counters that are operable independently of one another. Each NOx counter is incremented and decremented in accordance with the NOx storage/release characteristics of a corresponding one of the portions of the catalyst. The NOx storage/release characteristics of the portions of the catalyst are different from one another. For example, the NOx storage-reduction catalyst has a portion that is apt to trap and store NOx (a portion with high NOx trapping rate) and a portion that is less apt to trap and store NOx (a portion with low NOx trapping rate). Therefore, the storage of NOx from exhaust gas flowing into the catalyst tends to initially occur in the portion of the catalyst with greater aptitude for trapping NOx and then begin in the portion with less aptitude for trapping NOx after the storage of NOx in the portion with greater aptitude for trapping NOx has increased to a certain amount. Similarly, during the operation for regenerating the NOx storage-reduction catalyst, the desorption of NOx from the catalyst tends to initially occur in the portion with greater aptitude for trapping NOx and then begin in the portion with less aptitude for trapping NOx after the desorption of NOx from the portion with greater aptitude for trapping NOx has progressed to a certain degree.

An example of the portion that is apt to trap NOx is an upstream-side portion (inlet portion) of the NOx storage-reduction catalyst. An example of the portion that is less apt to trap NOx is a downstream-side portion (outlet portion) of the NOx storage-reduction catalyst. The exhaust gas flowing into the NOx storage-reduction catalyst first contacts the inlet portion of the catalyst. Therefore, while the NOx trapping capability of the inlet portion of the catalyst is high, most NOx in exhaust gas is trapped by the inlet portion and only a small amount of NOx reaches the outlet portion of the catalyst. Therefore, the storage of NOx from exhaust gas into the NOx storage-reduction catalyst initially occurs in the upstream-side portion (inlet portion) of the catalyst, and then begins in the downstream-side portion (outlet portion) of the catalyst after the NOx trapping capability of the upstream-side portion has decreased to a certain level. Hence, the upstream-side portion of the NOx storage-reduction catalyst is apt to store NOx, and the storage of NOx in the upstream-side portion increases in a short time. However, the downstream-side portion of the catalyst is less apt to store NOx, and the rate of increase in the storage of NOx in the downstream-side portion is lower.

A similar phenomenon occurs during the regeneration operation. When exhaust gas rich of stoichiometry flows into the NOx storage-reduction catalyst, the exhaust gas first contacts the inlet portion of the catalyst, and therefore releases NOx from the inlet portion and reduces the NOx. Therefore, a major portion of the unburned hydrocarbon, CO, etc. present in the exhausts gas is consumed for the reduction of NOx released from the inlet portion, so that the exhaust gas that reaches the outlet portion of the catalyst contains only a small amount of unburned hydrocarbon, CO, etc. for the reduction of NOx. Furthermore, since the air-fuel ratio of the exhaust gas increases to a nearly stoichiometric ratio due to the reduction of NOx before the exhaust gas reaches the outlet portion, the release of NOx from the outlet portion is less likely. Thus, during the regeneration operation for the NOx storage-reduction catalyst, the release of NOx readily occurs and the storage of NOx quickly decreases in the upstream-side portion of the catalyst whereas the rate of decrease in the storage of NOx in the downstream-side portion is low.

The portions of the NOx storage-reduction catalyst that are apt or less apt to trap NOx are not only the upstream-side portion and the downstream-side portion. For example, an upper coat layer portion of the catalyst is also apt to trap and release NOx since exhaust gas first contacts the upper coat layer potion. A lower coat layer portion of the catalyst is less apt to trap and release NOx since exhaust gas contacts the lower coat layer portion after contacting the upper layer portion. In this embodiment, the amounts of NOx stored in the portions with greater aptitude for trapping NOx and the portions with less aptitude for trapping NOx are separately estimated through the use of a first NOx counter whose increment/decrement characteristic is set in accordance with the trapping/releasing characteristic of the portions with greater aptitude for trapping NOx and a second NOx counter whose increment/decrement characteristic is set in accordance with the trapping/releasing characteristic of the portions with less aptitude for trapping NOx.

Figure 2:
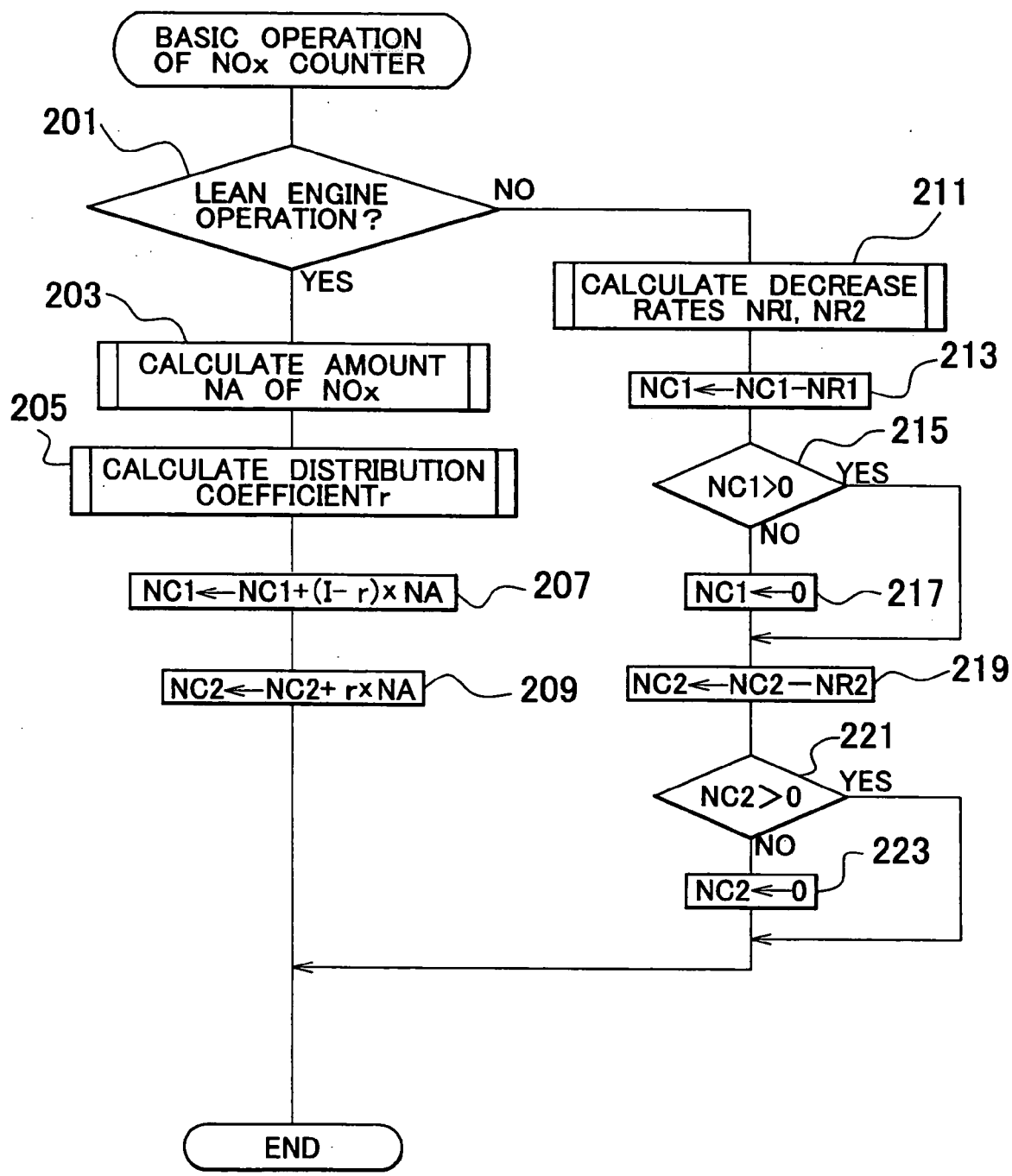
FIG. 2 is a flowchart illustrating a basic operation of incrementing and decrementing NOx counters in the embodiment.

FIG. 2 is a flowchart illustrating a basic operation of incrementing or decrementing a NOx counter in accordance with the embodiment. This operation is executed as a routine at regular time intervals. In the flowchart of FIG. 2, the process of steps 203 to 209 is an operation of incrementing NOx counters NC1, NC2 corresponding to the storage of NOx into the NOx storage-reduction catalyst during a lean air-fuel ratio operation of the engine, and the process of steps 211 to 223 is an operation of decrementing the NOx counters NC1, NC2 corresponding to release of NOx from the NOx storage-reduction catalyst during a stoichiometric air-fuel ratio operation of the engine or a rich air-fuel ratio operation of the engine performed at the time of the regeneration operation (rich-spike operation) or an increase in the load depending on a change in the engine operation condition.

The NOx storage-reduction catalyst 20 traps and stores NOx from incoming exhaust gas when the air-fuel ratio of the exhaust gas is lean of stoichiometry. When the air-fuel ratio of incoming exhaust gas becomes stoichiometric or rich of stoichiometry, the catalyst 20 releases NOx and catalyzes the reduction of NOx, thereby removing NOx. In the operation illustrated in FIG. 2, it is first determined in step 201 whether the engine is operating at a lean air-fuel ratio. If the lean air-fuel ratio operation of the engine is being performed, a NOx counter incrementing operation of steps 203 to 239 is subsequently executed. If the lean air-fuel ratio engine operation is not being performed (i.e., if the stoichiometric air-fuel ratio engine operation or the rich air-fuel ratio engine operation (including the rich-spike operation) is being performed), a NOx counter decrementing operation of steps 211 to 223 is subsequently executed.

In the incrementing process of steps 203 to 209, the production of NOx NA from the engine in a unit time (time interval of execution of the operation illustrated in FIG. 2) is first calculated in step 203. The amount of NOx produced from the engine in a unit time is determined by engine operation conditions, such as the engine rotation speed, the load (the amount of fuel injected or the amount of depression of the accelerator pedal), etc. It is considered that during the lean air-fuel ratio engine operation, the entire amount of NOx produced in the engine (i.e., the entire amount of NOx that flows into the NOx storage-reduction catalyst) is stored into the NOx storage-reduction catalyst while the NOx trapping capability of the NOx storage-reduction catalyst 20 is high.

Therefore, in the embodiment, the amounts of NOx discharged from a real engine in a unit time with the engine speed and the load being changed are measured beforehand, and the amounts of NOx discharged in the various engine operation conditions are stored together with the parameters of engine speed and load in the form of a numerical table in the ROM of the ECU 30. In step 203, an amount of NOx produced NA from the engine in a unit time in the present operation condition is read from the numerical table on the basis of the present engine speed and the present load.

In reality, the entire amount of NOx produced from the engine is not trapped and stored by the NOx storage-reduction catalyst, but a small amount of NOx passes through the catalyst without being stored into the catalyst even if the trapping capability of the NOx storage-reduction catalyst is high. Therefore, in this embodiment, the value of NA is obtained by multiplying the amount of NOx produced from the engine in a unit time by a predetermined proportion (which is the proportion of the amount of NOx stored into the NOx storage-reduction catalyst to the amount of NOx present in incoming exhaust gas, and which is about 1.0 in the embodiment).

Subsequently in step 205, a distribution coefficient r for dividing the amount of NOx NA determined in step 203 for the first and second NOx counters NC1, NC2 is calculated. That is, in the embodiment, considering the fact that the NOx storage-reduction catalyst 20 has portions that are apt to trap NOx and portions that are less apt to trap NOx, the amount of NOx NA that enters the NOx storage-reduction catalyst 20 is divided for these portions of the catalyst in accordance with the NOx trapping characteristics (aptitude for trapping NOx) of the portions.

That is, in steps 207 and 209, the counters NC1 and NC2 are incremented by the distributed values $(1-r) \times NA$ and $r \times NA$ that are determined through the use of the distribution coefficient r determined in step 205. In this embodiment, the counter NC1 indicates the amount of NOx stored in the portion that is relatively apt to trap NOx (a first portion of the catalyst that includes, for example, an upstream-side portion, an upper coat layer portion, etc.), and the counter NC2 indicates the amount of NOx stored in the portion that is relatively inapt to trap NOx (a second portion of the catalyst that includes, for example, a downstream-side portion, a lower coat layer portion, etc.). The distribution coefficient r is determined in accordance with the NOx trapping rates (the degrees of aptitude for trapping NOx) of the portions of the catalyst ($0 \leq r \leq 1$). By distributing the amount of NOx stored in the catalyst among the portions of the catalyst in accordance with the NOx trapping characteristics of the portions in the above-described manner, it becomes possible to accurately estimate the amount of NOx stored in the NOx storage-reduction catalyst.

If the trapping capability of the first portion of the catalyst is sufficiently high, for example, immediately after execution of the regeneration operation, substantially the entire amount of NOx entering the catalyst is stored into the first portion, and substantially no NOx reaches and is stored into the second portion. In this case, the distribution coefficient r is set at a value close to "0", so that the first NOx counter is increased at a relatively great rate and the rate of increase in the second NOx counter becomes very small.

When a considerable amount of NOx is stored in the first portion of the catalyst, the NOx trapping capability of the first portion becomes low, so that NOx reaches the second portion and the amount of NOx stored into the second portion increases. Therefore, in this case, the distribution coefficient r is set at a relatively great value, so that the rate of increase in the first NOx counter becomes relatively small and the rate of increase in the second NOx counter becomes relatively great.

The method of setting the distribution coefficient r will be described later. Due to the operation of steps 203 to 209, the NOx in exhaust gas that enters the NOx storage-reduction catalyst 20 during the lean air-fuel ratio engine operation is stored into the portions of the catalyst in accordance with the trapping characteristics of the portions, that is, the portions store amounts of NOx corresponding to their respective trapping characteristics. An operation of steps 211 to 223 of decreasing the counters will next be described.

If the air-fuel ratio of exhaust gas flowing into the NOx storage-reduction catalyst becomes equal to or less than the stoichiometric ratio, NOx stored in the NOx storage-reduction catalyst 20 is released from the catalyst. In such a case, the amount of NOx released (release rate) varies with the exhaust air-fuel ratio and, specifically, increases as the exhaust air-fuel ratio shifts to a richer side. In the case of release of NOx, too, the release rate is relatively great in, for example, the first portion of the catalyst, and is relative small in, for example, the second portion. While the first portion of the catalyst, for example, the upstream-side portion, the upper coat layer portion, etc., is releasing NOx, the unburned hydrocarbon, the reducer components and the like present in exhaust gas are consumed to reduce the NOx released from the first portion, so that substantially no NOx is released from the second portion of the catalyst, such as the downstream-side portion, the lower coat layer portion, etc.

Therefore, in this embodiment, the rates of decreasing the first NOx counter and the second NOx counter are set in accordance with the degree of richness of the air-fuel ratio of exhaust gas flowing into the catalyst, the amount of storage of NOx in the first portion of the catalyst, etc. Specifically, if it is determined in step 201 in FIG. 2 that the engine is operating at a stoichiometric or rich air-fuel ratio, the process proceeds to step 211, in which the decrease rates NR1, NR2 of the first and second NOx counters are calculated. The rates NR1, NR2 are set at greater values if the exhaust air-fuel ratio is lower (richer), and are changed in accordance with the elapsed time following the beginning of the rich air-fuel ratio engine operation. The setting of the decrease rates NR1, NR2 will be later described in detail.

Subsequently in step 213, the first NOx counter NC1 is decremented by the degrease rate NR1 calculated in step 211. In steps 215 and 217, a guarding operation is performed so as to avoid the post-decrement value of NC 1 being smaller than "0" (being negative). Similarly, in steps 219 to 221, the value of the second NOx counter NC2 is decremented by NR2, and is guarded so as not to be negative.

By separately determining the amounts of NOx released from the portions of the NOx storage-reduction catalyst in the above-described manner, it becomes possible to accurately estimate the amount of storage of NOx in the NOx storage-reduction catalyst. Examples of the setting of the distribution coefficient r in step 205 in FIG. 2 will next be described.

Examples of the method of setting the distribution coefficient r include the following:

(1) a method in which r is a fixed value;

(2) a method in which r is set in accordance with the amount of storage of NOx in the NOx storage-reduction catalyst;

(3) a method in which r is set in accordance with the degree of degradation of the NOx storage-reduction catalyst;

(4) a method in which r is set in accordance with the temperature of the NOx storage-reduction catalyst; and (5) a method in which r is set in accordance with the amount of flow of exhaust gas; and (6) a method in which r is set in accordance with the concentration of NOx in incoming exhaust gas.

The aforementioned methods will be separately described below.

(1) Method in Which r is Fixed

As described above, the first portion of the catalyst is apt to trap NOx, and the second portion is less apt to trap NOx. Therefore, the increase rate of the first NOx counter is greater than the increase rate of the second NOx counter. Therefore, in an approximation fashion, the value of r may be fixed so that $(1-r) > r$ holds. Using the fixed value of r, the first and second NOx counters are incremented. As for the value (fixed value) of r in this case, an optimal for the catalyst used is set on the basis of experiments with a real NOx storage-reduction catalyst.

(2) Method in Which r is Set in Accordance with the Amount of Storage of NOx in the NOx Storage-Reduction Catalyst When the NOx trapping capability of the first portion of the NOx storage-reduction catalyst is great, most NOx present in incoming exhaust gas is trapped and stored into the first portion of the catalyst, and substantially no NOx reaches the second portion, as mentioned above. However, as the storage of NOx in the first portion increases, the NOx trapping capability of the first portion decreases, and therefore the amount of NOx to be trapped and stored into the first portion gradually decreases. Therefore, the amount of NOx that reaches the second portion and is stored therein increases.

Figure 3:
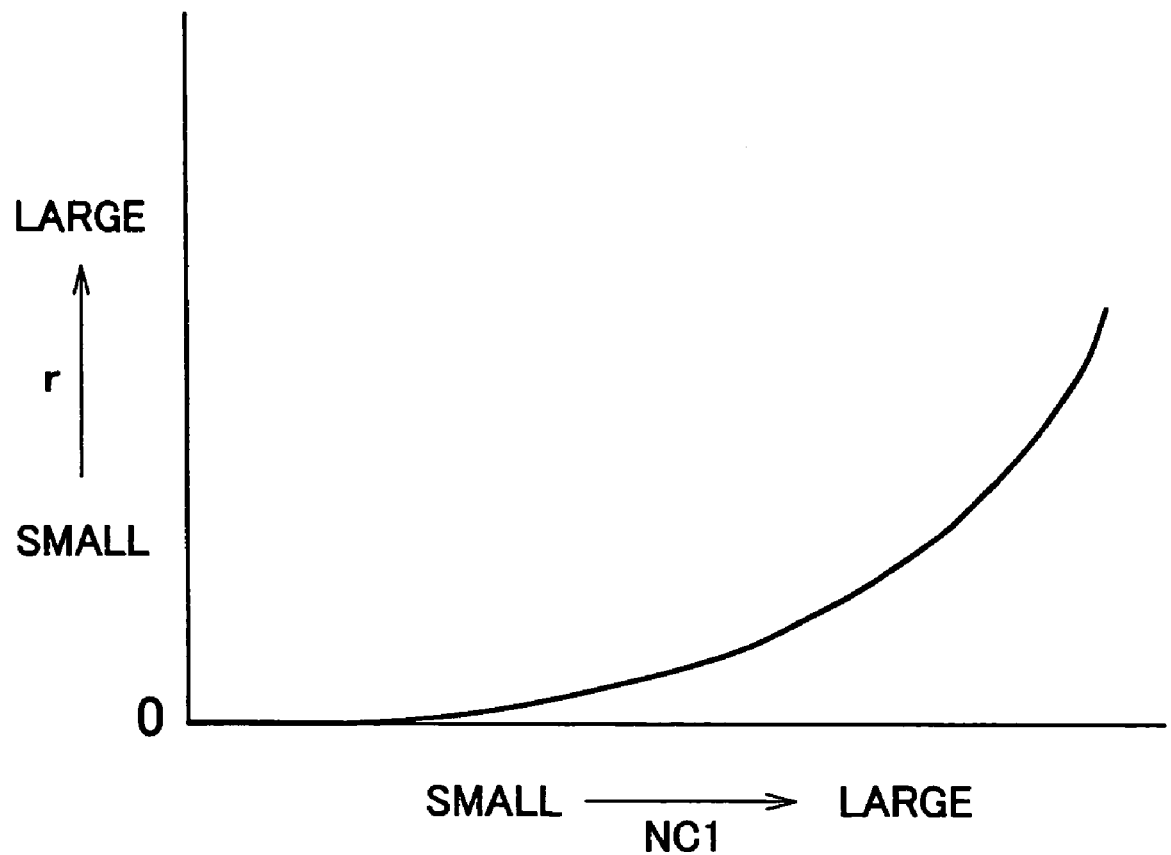
FIG. 3 is a diagram indicating a method for setting a distribution coefficient.

Hence, by changing the value of the distribution coefficient r in accordance with, for example, the amount of storage of NOx in the first portion, that is, the value of the first NOx counter, the storages of NOx in the portions of the catalyst can be accurately estimated. FIG. 3 is a graph indicating a relationship between the first NOx counter NC1 and the distribution coefficient r in this embodiment. As indicated in FIG. 3, while the value of NC1 is small and substantially no storage of NOx exists in the first portion of the catalyst, the value of r is set at values close to "0", so that the rate of increase in NC1 is close to NA (step 207 in FIG. 2). That is, substantially the entire amount of NOx that enters the NOx storage-reduction catalyst 20 is trapped and stored into the first portion of the catalyst.

Figure 4:
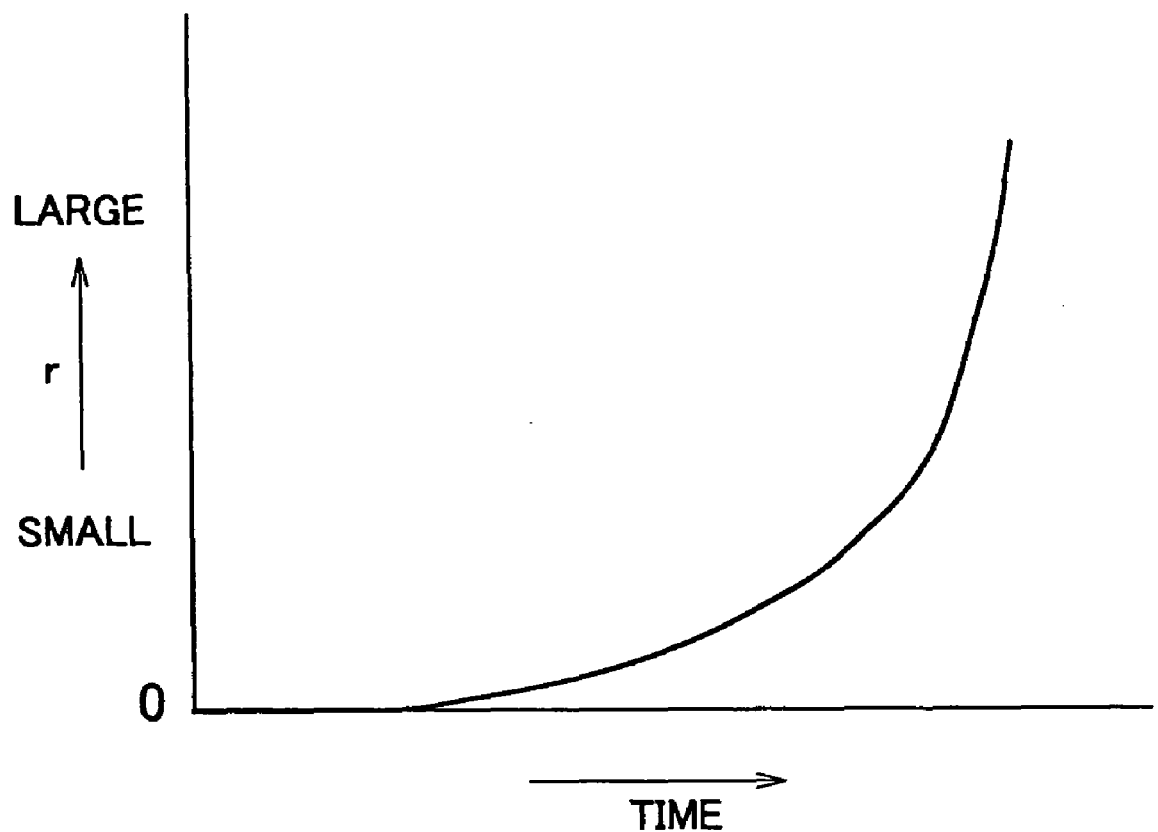
FIG. 4 is a diagram indicating another method for setting a distribution coefficient.

As the value of NC1 increases, that is, as the storage of NOx in the first portion of the catalyst increases, the value of r is increased, and the proportion of the amount of NOx trapped and stored into the second portion of the catalyst gradually increases. With regard to the setting of the distribution coefficient r in accordance with the amount of storage as described above, the distribution coefficient r may also be set in an approximation fashion in accordance with the elapsed time following the beginning of the lean air-fuel ratio engine operation after completion of the regeneration operation. FIG. 4 shows a setting curve for use for setting the distribution coefficient r in accordance with the elapsed time following the beginning of the lean air-fuel ratio operation, where the vertical axis indicates the distribution coefficient r and the horizontal axis indicates the elapsed time following the beginning of the lean air-fuel ratio engine operation after the end of the regeneration operation. The storages of NOx in the portions of the catalyst can also be accurately estimated by changing the distribution coefficient r in accordance with the elapsed time as indicated in FIG. 4.

Furthermore, the distribution coefficient r may also be set as r=0 (i.e., the entire amount of NOx is stored into only the first portion), for example, until the elapse of a predetermined time following the beginning of the lean air-fuel ratio engine operation, and is set as a constant value (e.g., r=0.5) after the elapse of the predetermined time, or is increased with time after the elapse of the predetermined time. In this case, the value of the second NOx counter remains at a constant value until the elapse of the predetermined time following the beginning of the lean air-fuel ratio, and starts increasing after the elapse of the predetermined time.

(3) Method in Which r Is Set in Accordance with the Degree of Degradation of the NOx Storage-Reduction Catalyst The first portion (e.g., the upstream-side portion and the upper coat layer portion) of the NOx storage-reduction catalyst 20 is apt to trap NOx, as stated above. This means that degradation of the first portion of the catalyst progresses fast. For example, the upstream-side portion and the upper coat layer portion of the catalyst are liable to have thermal degradation due to high temperature of exhaust gas that contacts these portions. Furthermore, if exhaust gas contains a sulfur component, the sulfur component is stored into the NOx storage-reduction catalyst similarly to NOx, and generally-termed sulfur poisoning occurs in which the accumulation of the sulfur component prevents recovery of the NOx trapping capability despite the regeneration operation. Of course, the sulfur poisoning is likely to occur in the first portion having great aptitude for trapping NOx.

Figure 5:
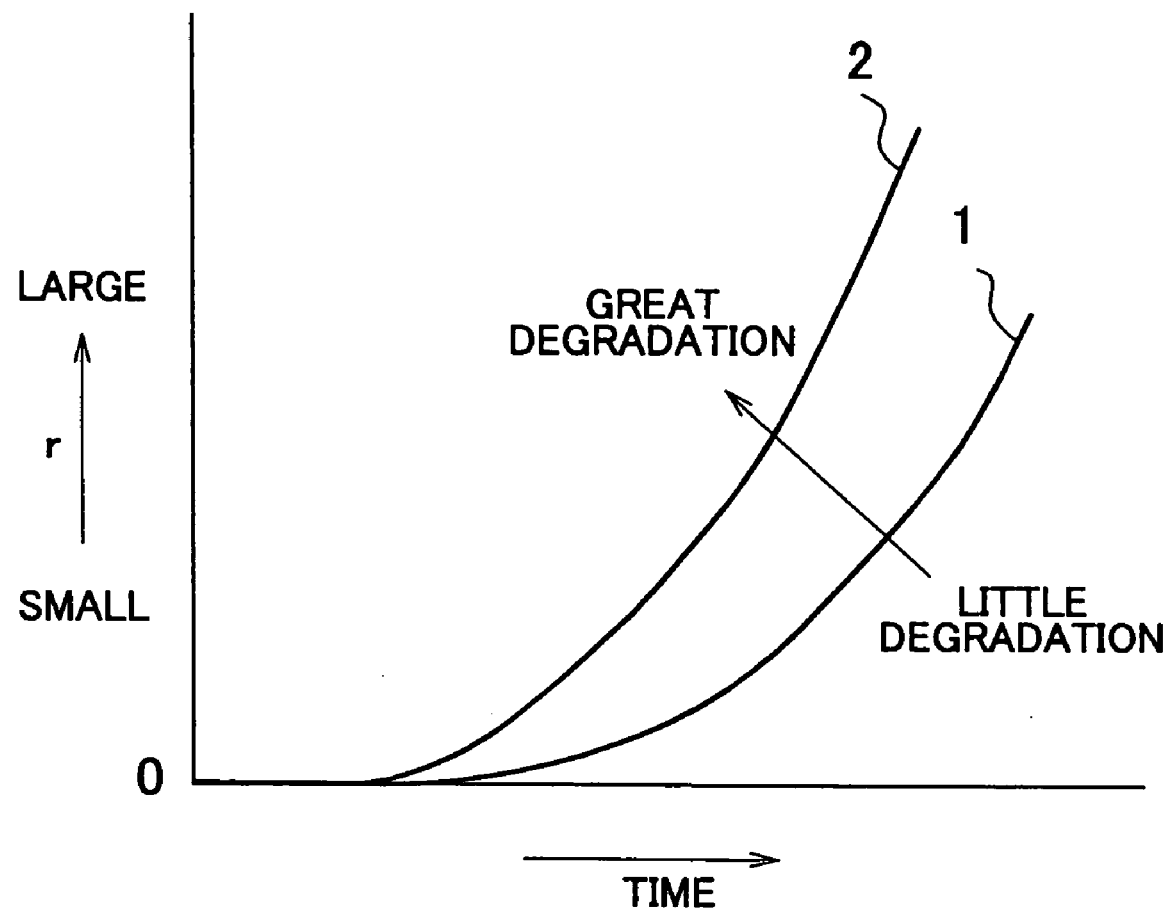
FIG. 5 is a diagram indicating still another method for setting a distribution coefficient.

Therefore, if degradation of the catalyst progresses, the first portion is subject to faster progress of the degradation and greater reduction in the NOx trapping capability than the second portion. FIG. 5 is a diagram for illustrating an example of the setting of the distribution coefficient r in the embodiment. In the example indicated in FIG. 5, the distribution coefficient r is set in accordance with the elapsed time following the beginning of the lean air-fuel ratio engine operation as in the case of FIG. 4. However, in the example of FIG. 5, as the degradation of the catalyst progresses, the curve for setting the distribution coefficient r is changed to another curve such that the value of r more quickly increases.

In FIG. 5, a curve 1 is used to set r if the catalyst has not degraded, and a curve 2 is used to set r after degradation of the catalyst has progressed. As indicated in FIG. 5, the curves 1 and 2 are set so that the value of r increases more quickly following the beginning of the lean air-fuel ratio engine operation in the case where the catalyst has degraded (curve 2) than in the case where the catalyst has not degraded (curve 1).

To detect the degree of degradation of the catalyst, any known method may be employed. It is also possible to employ a simple method in which the accumulated time of use of the catalyst is adopted as a parameter that indicates the degree of degradation of the catalyst and it is assumed that the catalyst degrades to increased degrees as the accumulated time of use increases. Thus, by changing the value of r in accordance with the degree of degradation of the catalyst, it becomes possible to accurately estimate the storage of NOx in the catalyst regardless of the state of degradation of the catalyst.

(4) Method in Which r is Set in Accordance with the Temperature of the NOx Storage-Reduction Catalyst The NOx trapping capability of the NOx storage-reduction catalyst changes in accordance with the catalyst temperature. For example, a normal NOx storage-reduction catalyst exhibits high NOx trapping capability within a relatively narrow temperature range, and the NOx trapping capability decreases if the catalyst temperature deviates from the range. Compared with the second portion of the NOx storage-reduction catalyst, the first portion is greatly affected by the exhaust temperature, and the temperature of the first portion of the catalyst changes with the exhaust temperature. Therefore, if the exhaust temperature is high, the NOx trapping capability of the first portion greatly drops even for a small storage of NOx, that is, the NOx trapping capability of the first portion degrades in a short time following the beginning of the lean air-fuel ratio engine operation.

Figure 6:
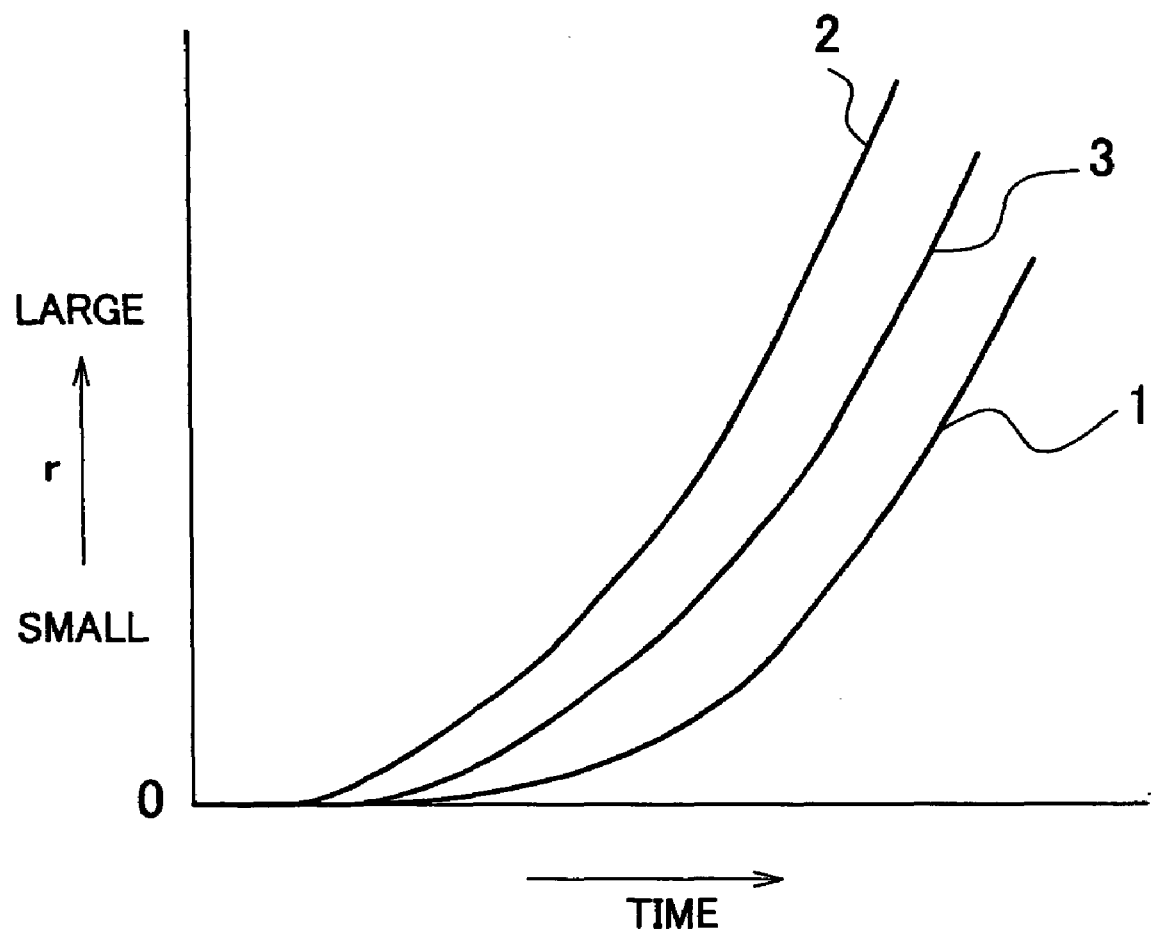
FIG. 6 is a diagram indicating a further method for setting a distribution coefficient.

If the exhaust temperature is low, the NOx trapping capability of the first portion of the catalyst also degrades in a short time following the beginning of the lean air-fuel ratio engine operation. Therefore, in the embodiment, the setting of the distribution coefficient r is changed in accordance with the catalyst temperature (exhaust temperature). FIG. 6 indicates an example in which changes in the catalyst temperature are taken into account in the changing of the value of r in accordance with time in each process of storage of NOx. In FIG. 6, a curve 1 is used to set the distribution coefficient r at a temperature that maximizes the trapping capability of the catalyst (e.g., about 670° K), and curves 2 and 3 are used to set the distribution coefficient r at a high-side temperature (e.g., about 720° K) and a low-side temperature (e.g., about 570° K.), respectively, at which the NOx trapping capability of the catalyst falls to the vicinity of an allowable limit.

Compared with the curve 1, the curves 2 and 3 are set so that the value of r increases quickly following the beginning of the lean air-fuel ratio engine operation since, in the case of the curves 2 and 3, the NOx trapping capability of the first portion of the catalyst greatly reduces even for a relatively small amount of NOx stored in the first portion. By changing the value of r in accordance with the catalyst temperature (exhaust temperature) as indicated in FIG. 6, it becomes possible to accurately estimate the storage of NOx in the NOx storage-reduction catalyst regardless of changes in the catalyst temperature (exhaust temperature).

(5) Method in Which r is Set in Accordance with the Amount of Flow of Exhaust Gas If the amount of flow of exhaust gas is large, the space velocity of the catalyst becomes large, so that the catalyst more readily stores NOx. Therefore, in such a case, the rate of increase in the storage of NOx in the first portion of the catalyst in particular becomes great, and the NOx trapping capability of the first portion degrades in a relatively short time following the beginning of the lean air-fuel ratio engine operation. Hence, by setting the distribution coefficient r so that the value of r increases more quickly following the beginning of the lean air-fuel ratio engine operation in the case of large amount of flow of exhaust gas than in the case of small amount of flow of exhaust gas, it becomes possible to exclude an error that is caused in the estimation of the storage of NOx by a change in the amount of flow of exhaust gas.

Figure 7:
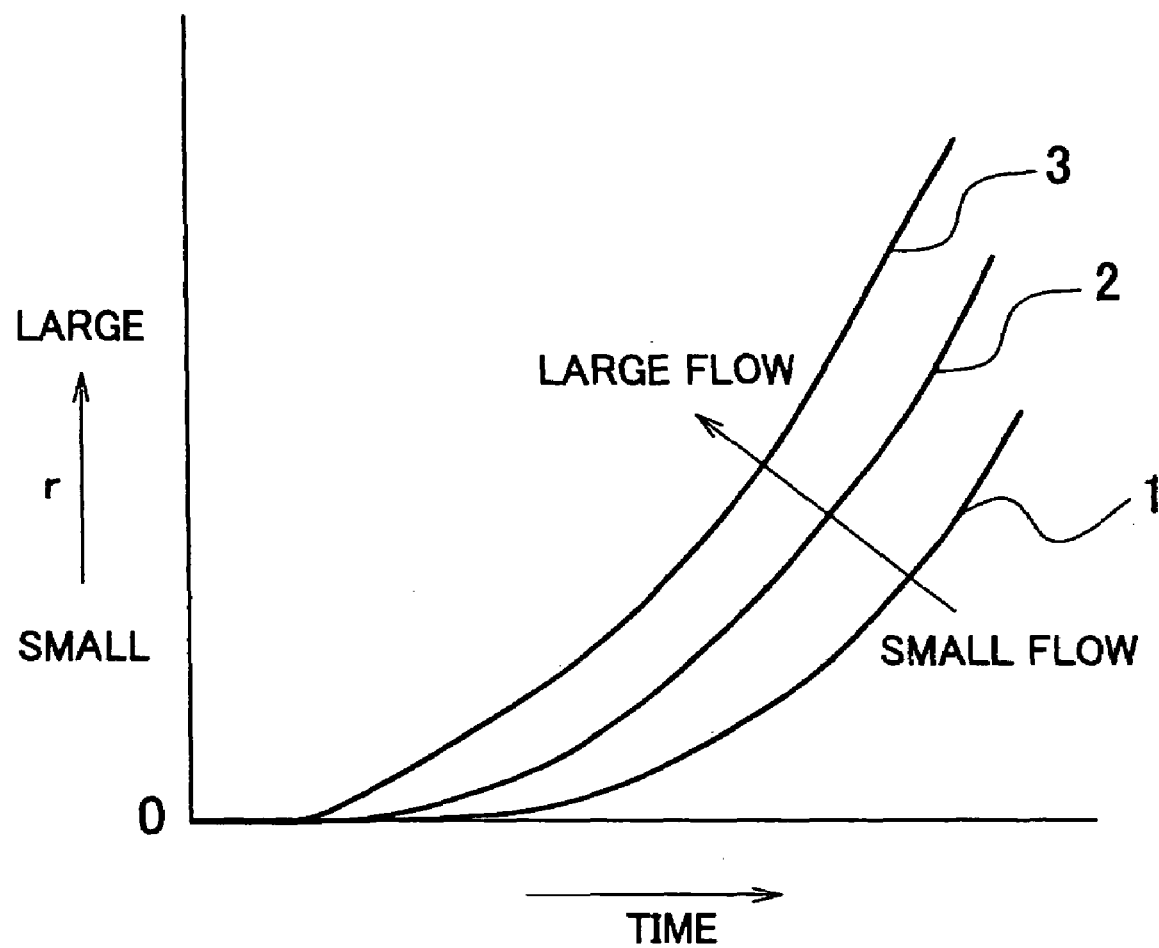
FIG. 7 is a diagram indicating a still further method for setting a distribution coefficient.

FIG. 7 indicates an example of the setting of the distribution coefficient r in which changes in the amount of flow of exhaust gas as mentioned above are taken into account in the changing of the value of r in accordance with time in every process of storage of NOx as in the case of FIG. 4. In FIG. 7, a curve 1 is used to set the distribution coefficient r when the amount of flow of exhaust gas is relatively small, and a curve 2 is used to set the distribution coefficient r when the amount of flow of exhaust gas is large than the amount of flow for the curve 1, and a curve 3 is used to set the distribution coefficient r when the amount of flow of exhaust gas is larger than the amount of flow for the curve 2. As indicated in FIG. 7, the value of r is set so as to increase more quickly following the beginning of the lean air-fuel ratio engine operation if the amount of flow of exhaust gas becomes larger.

(6) Method in Which r IS Set in Accordance with the NOx Concentration in Incoming Exhaust Gas If the concentration of NOx in exhaust gas is high, the catalyst is more likely to store NOx, and the storage of NOx in the first portion of the catalyst particularly quickly increases. In this case, too, the first portion experiences a reduced NOx trapping capability due to an increased storage of NOx in a relatively short time following the beginning of the lean air-fuel ratio engine operation. Therefore, if the NOx concentration in exhaust gas is high, it is necessary to set the distribution coefficient r so that the value of r also becomes large within a short time following the beginning of the lean air-fuel ratio engine operation.

Figure 8:
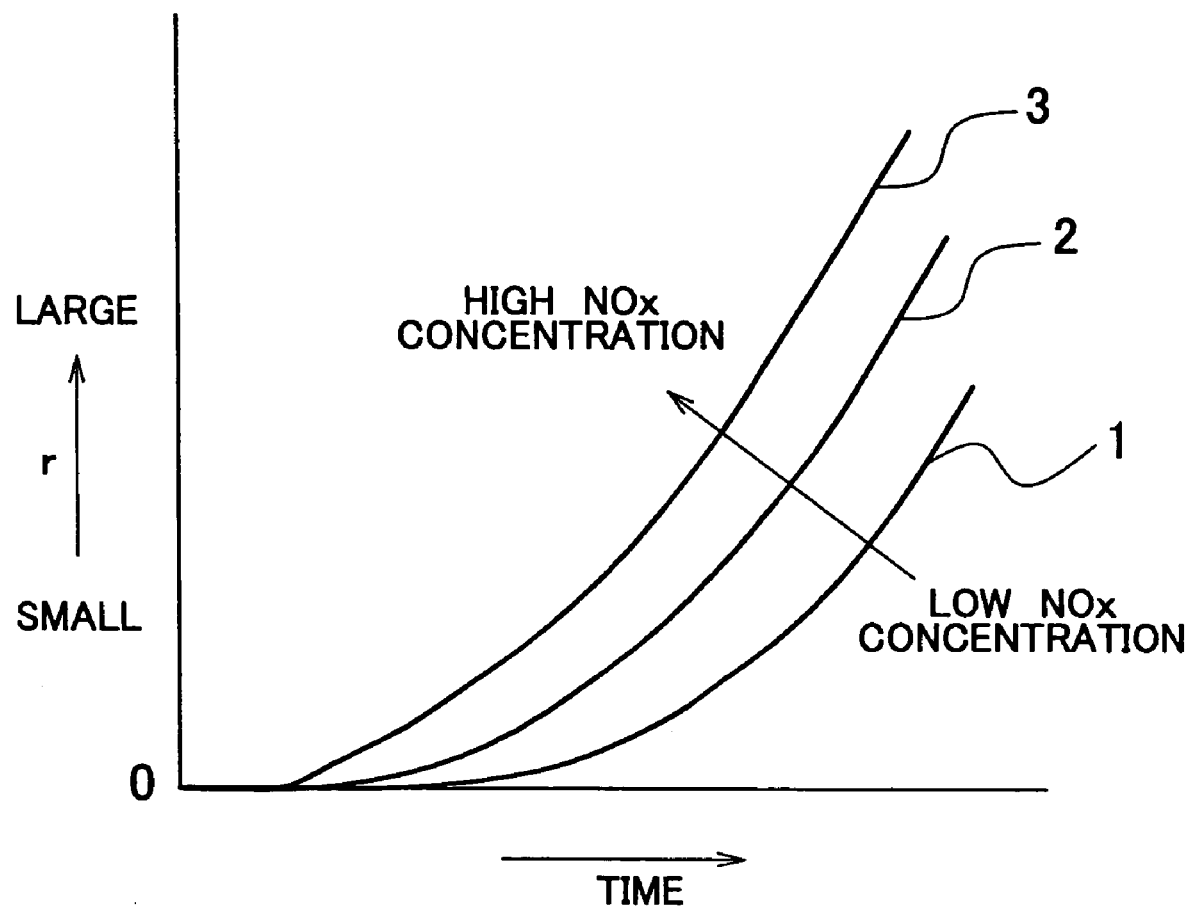
FIG. 8 is a diagram indicating a yet further method for setting a distribution coefficient.

FIG. 8 indicates an example of the setting of the distribution coefficient r in which changes in the NOx concentration in exhaust gas are taken into account in the changing of the value of the distribution coefficient r with time in every process of storing NOx as in FIG. 4. In FIG. 8, a curve 1 is used to set the distribution coefficient r if the NOx concentration in exhaust gas is low, and curves 2 and 3 are used to set the distribution coefficient r if the NOx concentration in exhaust gas is higher. As indicated in FIG. 8, the value of r is set so as to increase more quickly following the beginning of the lean air-fuel ratio engine operation if the NOx concentration in exhaust gas is higher.

By setting the distribution coefficient r in accordance with the NOx concentration in exhaust gas as indicated in FIG. 8, it becomes possible to accurately estimate the storage of NOx in the NOx storage-reduction catalyst regardless of changes in the NOx concentration in exhaust gas. In the methods (5) and (6), the distribution coefficient r is set in accordance with the amount of flow of exhaust gas and the concentration of NOx in exhaust gas, respectively. Generally, if the amount of NOx entering the catalyst in a unit time is larger, the amount of NOx trapped by the first portion of the catalyst becomes larger. Therefore, the value of r may be set in accordance with the multiplication product of the amount of flow of exhaust gas and the concentration of NOx in exhaust gas, or in accordance with the amount of NOx produced NA from the engine in a unit time (e.g., the value r is set so as to increase more quickly if NA is greater), instead of taking the exhaust gas flow and the exhaust NOx concentration separately into account.

By factoring in various conditions as described above, it becomes possible to accurately estimate the amounts of NOx stored into the portions of the NOx storage-reduction catalyst from exhaust gas during the lean air-fuel ratio engine operation. However, in order to accurately estimate the storage of NOx in the NOx storage-reduction catalyst, the above-described accurate estimation of the amount of NOx trapped into the catalyst from exhaust gas is not the only requirement, but accurate estimation of the amounts of NOx released from the portions of the catalyst during the rich air-fuel ratio engine operation is also needed.

As stated above, the second portion of the NOx storage-reduction catalyst is less apt to release NOx than the first portion of the catalyst. Therefore, during the regeneration operation, the rate of decrease in the storage of NOx is smaller in the second portion than in the first portion. Hence, if the storage of NOx in the catalyst is estimated through the use of the NOx counters on the assumption that the second portion exhibits a rate of decrease in the storage of NOx which is equal to that of the first portion, inaccurate estimation of the storage of NOx in the second portion results.

Therefore, in this embodiment, the first portion and the second portion of the catalyst are assigned with different values (NR1, NR2) of the NOx counter decreasing rate during the rich air-fuel ratio engine operation as in step 211 in FIG. 2. That is, in the embodiment, the decrease rate NR2 for the second portion is set smaller than the decrease rate N1 for the first portion, factoring in different release rates of the first and second portions. Therefore, during the rich air-fuel ratio engine operation, such as the regeneration operation, the amounts of NOx released from the portions of the NOx storage-reduction catalyst can be accurately estimated. By using the amounts of NOx released from the portions of the NOx storage-reduction catalyst together with the amounts of NOx stored during the lean air-fuel ratio engine operation, it becomes possible to accurately estimate the present storage of NOx in the NOx storage-reduction catalyst.

It is to be noted herein that the release rate of NOx from the NOx storage-reduction catalyst increases as the air-fuel ratio of exhaust gas flowing into the catalyst decreases (shifts to a richer side) provided that the other conditions remain unchanged. Furthermore, the release rates of NOx from the portions of the catalyst vary depending on the kind of catalyst, the size thereof, etc. Therefore, in this embodiment, the rates of release of NOx from the portions of the catalyst with respect to varied air fuel ratios of incoming exhaust gas are determined through experiments using a real NOx storage-reduction catalyst, and relationships of the decrease rates NR1, NR2 for the NOx counters of the portions of the catalyst with the air-fuel ratio are pre-stored in the ROM of the ECU 30. In step 211 in FIG. 2, the rates of decreasing the NOx counters for the portions of the catalyst during the rich air-fuel ratio engine operation are determined from the engine air-fuel ratio with reference to the stored relationships.

Next, the regeneration operation in the embodiment will be described. As described above, in the embodiment, when NOx is to be released from the NOx storage-reduction catalyst, the regeneration operation is performed to recover the NOx trapping capability of the NOx storage-reduction catalyst. In this embodiment, it is determined whether it is time to perform, as a regeneration operation, the rich-spike operation of operating the engine 1 at a rich air-fuel ratio for a short time and thereby supplying a rich air-fuel ratio exhaust gas to the NOx storage-reduction catalyst 20 so as to release NOx from the NOx storage-reduction catalyst, that is, it is determined whether to execute the rich-spike operation, on the basis of the values of the NOx counters NC1, NC2 for the portions of the catalyst.

The determination as to whether the rich-spike operation should be executed will be described below.

In the embodiment, the rich-spike operation is executed when the sum (NC1+NC2) of the first NOx counter NC1 and the second NOx counter NC2 reaches a predetermined criterion. The first portion of the catalyst is apt to trap and release NOx as described above. Therefore, execution of the rich-spike operation causes substantially complete release of NOx from the first portion of the catalyst, resulting in substantially no storage of NOx in the first portion. On the other hand, the second portion of the catalyst is less apt to trap and release NOx. Therefore, in some cases, a certain amount of the NOx stored in the second portion of the catalyst is not released but remains in the second portion, despite execution of the rich-spike operation. In such a case, NOx is accumulated in the second portion of the catalyst every time the process of storage and release of NOx is performed.

Immediately after the lean air-fuel ratio engine operation, the NOx trapping capability of the first portion of the catalyst is high so that substantially the entire amount of NOx that enters the catalyst is stored into the first portion. However, as time elapses following the beginning of the lean air-fuel ratio engine operation, the NOx trapping capability of the first portion of the catalyst decreases due to increasing storage of NOx, and therefore the proportion of the amount of NOx stored into the second portion of the catalyst to the total amount of NOx that enters the catalyst increases.

However, if in this case, the storage of NOx in the second portion of the catalyst has already become large and the NOx trapping capability of the second portion of the catalyst has become low, the NOx that passes through the first portion and reaches the second portion of the catalyst is likely to pass through the second portion without being stored into the second portion. Conversely, if the second portion of the NOx storage-reduction catalyst has only a small storage of NOx and retains a good NOx trapping capability when the storage of NOx in the first portion of the catalyst has become relatively large, the NOx that passes through the first portion is entirely stored into the second portion of the catalyst.

Therefore, the storages of NOx in the first portion and the second portion of the catalyst need to be considered in order to precisely determine whether to execute the operation for recovering the NOx trapping capability of the NOx storage-reduction catalyst. In this embodiment, the rich-spike operation is performed in such a fashion that the sum of the storage of NOx in the first portion and the storage of NOx in the second portion of the catalyst will not exceed a predetermined value. That is, the rich-spike operation is performed every time the sum of the NOx counters NC1 and NC2 reaches a predetermined value.

Therefore, while the amount of residual NOx in the second portion of the catalyst is small and the trapping capability of the second portion is high, the regeneration operation is not executed until the storage of NOx in the first portion of the catalyst reaches a relatively great value. Conversely, if the amount of residual NOx in the second portion of the catalyst has become relatively large, the rich-spike operation is executed when the storage of NOx in the first portion of the catalyst reaches a relatively small value. Thus, the NOx trapping capability of each portion of the catalyst can be effectively utilized.

Specifically, the ECU 30 in the embodiment, following a routine (not shown), monitors the sum (NC1+NC2) of the first and second NOx counters at constant time intervals. Every time the sum (NC1+NC2) reaches a predetermined value, the ECU 30 executes the rich-spike operation, so that the storage of NOx in each portion of the catalyst will not exceed a predetermined value.

Next, the timing of ending the rich-spike operation in the embodiment will be described. The rich-spike operation may be continued for a fixed time. However, in the embodiment, the end timing of the rich-spike operation is determine on the basis of the output of the $O_2$ sensor 35 disposed in the exhaust passageway downstream of the NOx storage-reduction catalyst 20. That is, after the rich-spike operation begins, the air-fuel ratio of exhaust gas that enters the NOx storage-reduction catalyst 20 shifts to the rich side of stoichiometry, so that NOx stored in the catalyst is released, and is reduced on the catalyst into $N_2$ through reactions with unburned hydrocarbon, CO, etc. present in exhaust gas. Therefore, while the catalyst is releasing NOx, unburned hydrocarbon, CO, etc. present in exhaust gas are consumed for reduction of the NOx. Due to the thus-decreased amounts of hydrocarbon, CO, etc. present in exhaust gas and a relatively increased concentration of oxygen in exhaust gas, the air-fuel ratio of exhaust gas at the outlet of the NOx storage-reduction catalyst becomes near stoichiometry. That is, while the NOx storage-reduction catalyst 20 is releasing NOx during execution of the rich-spike operation, the exhaust oxygen concentration detected by the $O_2$ sensor 35 disposed downstream of the catalyst 20 remains at a value corresponding to the stoichiometric air-fuel ratio. When the release of NOx from the NOx storage-reduction catalyst is completed and no more NOx is released from the catalyst, the unburned hydrocarbon, CO, etc. in exhaust gas reaches the downstream side of the catalyst, so that the exhaust oxygen concentration detected by the $O_2$ sensor 35 reaches a value corresponding to a rich air-fuel ratio substantially equal to the rich air-fuel ratio on the upstream side of the catalyst.

Considering the above-described facts, the embodiment is designed so as to end the rich-spike operation when the exhaust oxygen concentration detected by the $O_2$ sensor 35 disposed downstream of the NOx storage-reduction catalyst 20 changes from a value corresponding to the stoichiometric air-fuel ratio to a value corresponding to the rich air-fuel ratio. However, if the rich-spike operation is executed only on the basis of the exhaust oxygen concentration detected by the $O_2$ sensor 35, there arises a problem of insufficient release of NOx from the second portion of the catalyst.

The rate of desorption of NOx from the first portion of the catalyst is great as mentioned above. The unburned hydrocarbon, CO, etc. in incoming exhaust gas that contribute to the reduction of NOx, that is, removal of NOx, are substantially consumed in the first portion, and do not reach the second portion of the catalyst. After the desorption of NOx from the first portion of the catalyst is completed, the unburned hydrocarbon, CO, etc. in incoming exhaust gas reach the second portion of the catalyst, and NOx is released from the second portion. However, since the second portion of the catalyst has a smaller desorption rate of NOx than the first portion, only a portion of the unburned hydrocarbon, CO, etc. is consumed in the second portion, and the rest passes through the catalyst.

Therefore, in reality, the output of the $O_2$ sensor 35 disposed downstream of the NOx storage-reduction catalyst 20 changes from a value corresponding to the stoichiometric air-fuel ratio to a value corresponding to the rich air-fuel ratio, at the time of completion of the desorption of NOx from the first portion of the catalyst. Therefore, if the rich-spike operation is ended on the basis of the output of the $O_2$ sensor 35, the rich-spike operation ends and the lean air-fuel ratio engine operation begins before NOx is significantly released from the second portion of the catalyst. Therefore, there arises a problem of increased storage of NOx in the second portion of the catalyst.

Therefore, in the embodiment, the rich-spike operation is not immediately ended at the time of change in the output of the $O_2$ sensor 35 from stoichiometric to rich of stoichiometry, but is continued after the change in the sensor output. Then, it is considered that the storage of NOx in the second portion of the catalyst has started to decrease when the output of the $O_2$ sensor 35 changes to a rich air-fuel ratio-corresponding value. That is, in the embodiment, the value of the first NOx counter NC1 starts to decrease immediately upon start of the rich-spike operation. However, the value of the second NOx counter NC2 is not decreased but is maintained while the output of the $O_2$ sensor 35 remains at a stoichiometric air-fuel ratio-corresponding value. After a stoichiometric-to-rich air-fuel ratio change in the output of the $O_2$ sensor 35, the value of the second NOx counter NC2 starts to be decreased.

If after the output of the $O_2$ sensor 35 changes to a rich air-fuel ratio state, the rich air-fuel ratio cannot be maintained for a sufficiently long time but the lean air-fuel ratio engine operation is restarted due to, for example, a request in terms of engine operation, the value of the second NOx counter NC2 may start to be increased when the output of the $O_2$ sensor 35 changes from the lean air-fuel ratio state to the rich air-fuel ratio state. By changing the second NOx counter on the basis of the output of the $O_2$ sensor 35 disposed downstream of the NOx storage-reduction catalyst 20 during and after the regeneration operation in the above-described manner, the storage of NOx in the second portion of the catalyst can be accurately estimated.

Next, another embodiment of the rich-spike operation will be described. In the foregoing embodiment, during the rich-spike operation, the rich air-fuel ratio engine operation is continued even after the output of the $O_2$ sensor 35 disposed downstream of the NOx storage-reduction catalyst changes from the stoichiometric air-fuel ratio-corresponding value to the rich air-fuel ratio-corresponding value. In this case, however, the unburned hydrocarbon and the like present in exhaust gas are not completely consumed in the second portion of the catalyst, and therefore a residual amount of hydrocarbon may exit the catalyst and may go out into the atmosphere.

Furthermore, if the rich-spike continuation time is increased every time the rich spike is performed, there arises a problem of increased fuel consumption by the engine. Therefore, in the embodiment, during execution of the rich spike, the engine is operated at the stoichiometric air-fuel ratio simultaneously with a stoichiometric-to-rich air-fuel ratio change in the output of the $O_2$ sensor 35. Even if the air-fuel ratio is stoichiometric, the second portion of the catalyst releases NOx, so that the storage of NOx in the second portion decreases. Thus, the second portion of the catalyst, following the first portion, is caused to release NOx by maintaining the air-fuel ratio of incoming exhaust gas at the stoichiometric air-fuel ratio, so that emission of unburned hydrocarbon and the like into the atmosphere can be prevented.

If every execution of the rich-spike is followed by the stoichiometric air-fuel ratio engine operation, there is a danger of increase in the fuel consumption of the engine. In the embodiment, therefore, the stoichiometric air-fuel ratio engine operation is performed following the rich-spike operation only if the second NOx counter increases to a predetermined criterion. Therefore, increased fuel consumption by the engine is prevented. That is, at the time of execution of the rich-spike operation in the embodiment, the following operation is performed in accordance with the values of the first and second NOx counters.

1) The rich-spike operation is started when the sum (NC1+NC2) of the first and second NOx counters reaches a predetermined criterion.

2) If in this case, the output of the $O_2$ sensor 35 disposed downstream of the NOx storage-reduction catalyst 20 is the stoichiometric air-fuel ratio-corresponding value, the value of the second NOx counter NC2 is not reduced but is maintained at the value occurring before the start of the rich-spike operation.

3) If the value of the second NOx counter NC2 is less than or equal to a predetermined value, the rich-spike operation is ended and the lean air-fuel ratio engine operation is restarted when the output of the $O_2$ sensor 35 changes from the stoichiometric air-fuel ratio-corresponding value to the rich air-fuel ratio-corresponding value.

4) If the value of the second NOx counter NC2 is greater than the predetermined value, the rich-spike operation is ended followed by the stoichiometric air-fuel ratio engine operation when the output of the $O_2$ sensor 35 changes from a stoichiometric air-fuel ratio-corresponding value to a rich air-fuel ratio-corresponding value during the rich-spike operation.

5) The value of the second NOx counter NC2 is decreased during the stoichiometric air-fuel ratio engine operation. When the value of NC2 decreases to a predetermined lower limit value, the stoichiometric air-fuel ratio engine operation is ended and the lean air-fuel ratio engine operation is restarted. By performing the rich spike operation as described above, it becomes possible to efficiently use the trapping capability of each portion of the NOx storage-reduction catalyst without causing degraded exhaust property nor increased fuel consumption.

Although in the foregoing embodiments, the duration of the stoichiometric air-fuel ratio engine operation at the time of the rich-spike operation is determined in accordance with the storage of NOx in the second portion of the catalyst, that is, the value of the second NOx counter NC2, it is also possible to change the operating air-fuel ratio during the rich-spike operation in accordance with the value of the second NOx counter NC2 instead of performing the stoichiometric air-fuel ratio engine operation following the rich air-fuel ratio engine operation during the rich-spike operation.

Specifically, if the air-fuel ratio of exhaust gas flowing into the catalyst is richer of stoichiometry, the amount of unburned hydrocarbon, CO, etc. present in the exhaust gas reaching the second portion of the catalyst becomes larger, so that the desorption of NOx from the second portion of the catalyst during the rich-spike operation increases. Therefore, by setting the engine air-fuel ratio during the rich-spike operation lower (richer of stoichiometry) if the value of the second NOx counter NC2 at the beginning of the rich-spike operation is larger, it becomes possible to release NOx from the second portion of the catalyst as well without the need to perform the stoichiometric air-fuel ratio engine operation following the rich air-fuel ratio engine operation during the rich-spike operation.

In the foregoing embodiments, the NOx storage-reduction catalyst is divided into two portions, and NOx counters each of which is incremented and decremented in accordance with the NOx absorption(adsorption)-desorption characteristic of a corresponding one of the portions are provided. However, it should be apparent that the NOx storage-reduction catalyst may be divided into three or more portions and the same number of NOx counters may be provided in a one-to-one correspondence to the portions of the catalyst.

The foregoing embodiments are also applicable to SOx substantially in the same manners as described above. If SOx counters that are incremented and decremented in accordance with the SOx trap-desorption characteristics of the portions of the catalyst are provided in a one-to-one correspondence instead of or in addition to the NOx counters, it becomes possible to accurately grasp the amount of storage of SOx in the NOx storage-reduction catalyst instead of or in addition to the amount of storage of NOx in the catalyst.

All the foregoing embodiments achieve the advantage of accurately estimating the storage of NOx or SOx in the NOx storage-reduction catalyst and therefore effectively utilizing the trapping capability of the NOx storage-reduction catalyst.

What is claimed is:

1. An exhaust gas purification apparatus for an internal combustion engine, comprising:
   a NOx storage-reduction catalyst which is disposed in an exhaust passageway of the internal combustion engine, and which selectively traps and stores a specific component that includes at least one of nitrogen oxides (NOx) and sulfur oxides (SOx) from an exhaust gas coming into the NOx storage-reduction catalyst by at least one of adsorption and absorption when the exhaust gas coming into the catalyst has an air-fuel ratio lean of stoichiometry, and which releases the specific component stored and removes the specific component through reduction when the exhaust gas coming into the catalyst has a stoichiometric or rich-of-stoichiometry air-fuel ratio;
   a estimation device that estimates an amount of storage of the specific component in the NOx storage-reduction catalyst and an amount of release of the specific component from the NOx storage-reduction catalyst; and
   a regeneration device that performs a regeneration operation of releasing the specific component stored in the NOx storage-reduction catalyst and removing the specific component through reduction by supplying a rich-of-stoichiometry exhaust gas to the NOx storage-reduction catalyst based on the amount of storage of the specific component estimated by the estimation device,
   wherein the estimation device estimates the amount of storage of the specific component and the amount of release of the specific component with respect to each one of at least two different portions of the NOx storage-reduction catalyst, and
   wherein the estimation device indicates the amount of storage of the specific component in each portion of the NOx storage-reduction catalyst by using a storage counter, and estimates the amount of storage of the specific component in each portion of the NOx storage-reduction catalyst by incrementing the storage counter at a rate proportional to a concentration of the specific component in the exhaust gas coming into the NOx storage-reduction catalyst when the exhaust gas coming into the catalyst has an air-fuel ratio lean of stoichiometry, and decrementing the storage counter at a predetermined rate when the exhaust gas coming into the catalyst has a stoichiometric or rich-of-stoichiometry air-fuel ratio.

2. The exhaust gas purification apparatus according to claim 1, wherein the estimation device estimates the amount of storage of the specific component in each portion of the NOx storage-reduction catalyst by distributing an entire amount of the specific component storable in the NOx storage-reduction catalyst to the at least two portions of the NOx storage-reduction catalyst at a predetermined distribution ratio while the NOx storage-reduction catalyst is trapping and storing the specific component.

3. The exhaust gas purification apparatus according to claim 1, wherein the estimation device estimates the amount of storage of the specific component in each portion of the NOx storage-reduction catalyst by determining the amount of release of the specific component from each portion of the NOx storage-reduction catalyst during the regeneration operation for the NOx storage-reduction catalyst.

4. The exhaust gas purification apparatus according to claim 2, wherein the estimation device sets the predetermined distribution ratio in accordance with the amounts of storage of the specific component in the at least two portions of the NOx storage-reduction catalyst.

5. The exhaust gas purification apparatus according to claim 2, wherein the estimation device sets the predetermined distribution ratio in accordance with a degree of degradation of the NOx storage-reduction catalyst.

6. The exhaust gas purification apparatus according to claim 2, wherein the estimation device sets the predetermined distribution ratio in accordance with a temperature of the NOx storage-reduction catalyst.

7. The exhaust gas purification apparatus according to claim 2, wherein the estimation device sets the predetermined distribution ratio in accordance with an amount of flow of exhaust gas into the NOx storage-reduction catalyst.

8. The exhaust gas purification apparatus according to claim 2, wherein the estimation device sets the predetermined distribution ratio in accordance with a concentration of the specific component in an exhaust gas flowing into the NOx storage-reduction catalyst.

9. The exhaust gas purification apparatus according to claim 3, wherein the estimation device comprises an $O_2$ sensor that is disposed downstream of the NOx storage-reduction catalyst and that detects an exhaust oxygen concentration, and estimates the amount of the specific component released from each portion of the NOx storage-reduction catalyst based on an output of the $O_2$ sensor during the regeneration operation for the NOx storage-reduction catalyst.

10. The exhaust gas purification apparatus according to claim 1, wherein the regeneration device performs the regeneration operation based on a total of estimated amounts of storage of the specific component in the at least two portions of the NOx storage-reduction catalyst.

11. The exhaust gas purification apparatus according to claim 1, wherein the regeneration device determines a duration of maintaining the air-fuel ratio of the exhaust gas flowing into the NOx storage-reduction catalyst at a stoichiometric air-fuel ratio after a short time of maintaining the air-fuel ratio rich of stoichiometry during execution of the regeneration operation based on the amount of storage of the specific component in a specific portion among estimated amounts of storage of the specific component in the at least two portions of the NOx storage-reduction catalyst.

12. The exhaust gas purification apparatus according to claim 11, wherein the specific portion of the NOx storage-reduction catalyst is a portion that has a lower rate of release of the specific component during execution of the regeneration operation than another portion of the NOx storage-reduction catalyst.

13. An exhaust gas purification method for an internal combustion engine including a NOx storage-reduction catalyst which is disposed in an exhaust passageway of the internal combustion engine, and which selectively traps and stores a specific component that includes at least one of nitrogen oxides (NOx) and sulfur oxides (SOx) from an exhaust gas coming into the NOx storage-reduction catalyst by at least one of adsorption and absorption when the exhaust gas coming into the catalyst has an air-fuel ratio lean of stoichiometry, and which releases the specific component stored and removes the specific component through reduction when the exhaust gas coming into the catalyst has a stoichiometric or rich-of-stoichiometry air-fuel ratio, the method comprising the steps of:
 estimating an amount of storage of the specific component in the NOx storage-reduction catalyst and an amount of release of the specific component from the NOx storage-reduction catalyst; and
 performing a regeneration operation of releasing the specific component stored in the NOx storage-reduction catalyst and removing the specific component through reduction by supplying a rich-of-stoichiometry exhaust gas to the NOx storage-reduction catalyst based on the amount of storage of the specific component,
 wherein the estimating step estimates the amount of storage of the specific component and the amount of release of the specific component with respect to each one of at least two different portions of the NOx storage-reduction catalyst, and
 wherein the estimating step indicates the amount of storage of the specific component in each portion of the NOx storage-reduction catalyst by using a storage counter, and estimates the amount of storage of the specific component in each portion of the NOx storage-reduction catalyst by incrementing the storage counter at a rate proportional to a concentration of the specific component in the exhaust gas coming into the NOx storage-reduction catalyst when the exhaust gas coming into the catalyst has an air-fuel ratio lean of stoichiometry, and decrementing the storage counter at a predetermined rate when the exhaust gas coming into the catalyst has a stoichiometric or rich-of-stoichiometry air-fuel ratio.

14. The exhaust gas purification method according to claim 13, wherein the estimating step estimates the amount of storage of the specific component in each portion of the NOx storage-reduction catalyst by distributing an entire amount of the specific component storable in the NOx storage-reduction catalyst to the at least two portions of the NOx storage-reduction catalyst at a predetermined distribution ratio while the NOx storage-reduction catalyst is trapping and storing the specific component.

15. The exhaust gas purification method according to claim 13, wherein the estimating step estimates the amount of storage of the specific component in each portion of the NOx storage-reduction catalyst by determining the amount of release of the specific component from each portion of the NOx storage-reduction catalyst during the regeneration operation for the NOx storage-reduction catalyst.

16. The exhaust gas purification method according to claim 14, wherein the estimating step sets the predetermined distribution ratio in accordance with the amounts of storage of the specific component in the at least two portions of the NOx storage-reduction catalyst.

17. The exhaust gas purification method according to claim 14, wherein the estimating step sets the predetermined distribution ratio in accordance with a degree of degradation of the NOx storage-reduction catalyst.

18. The exhaust gas purification method according to claim 14, wherein the estimating step sets the predetermined distribution ratio in accordance with a temperature of the NOx storage-reduction catalyst.

19. The exhaust gas purification method according to claim 14, wherein the estimating step sets the predetermined distribution ratio in accordance with an amount of flow of exhaust gas into the NOx storage-reduction catalyst.

20. The exhaust gas purification method according to claim 14, wherein the estimating step sets the predetermined distribution ratio in accordance with a concentration of the specific component in an exhaust gas flowing into the NOx storage-reduction catalyst.

21. The exhaust gas purification method according to claim 15, wherein the estimating step detects an exhaust oxygen concentration of downstream of the NOx storage-reduction catalyst, and estimates the amount of the specific component released from each portion of the NOx storage-reduction catalyst based on the exhaust oxygen concentration of downstream of the NOx storage-reduction catalyst during the regeneration operation for the NOx storage-reduction catalyst.

22. The exhaust gas purification method according to claim 13, wherein the regeneration operation is based on a total of estimated amounts of storage of the specific component in the at least two portions of the NOx storage-reduction catalyst.

23. The exhaust gas purification method according to claim 13, wherein the regenerating step determines a duration of maintaining the air-fuel ratio of the exhaust gas flowing into the NOx storage-reduction catalyst at a stoichiometric air-fuel ratio after a short time of maintaining the air-fuel ratio rich of stoichiometry during execution of the regeneration operation based on the amount of storage of the specific component in a specific portion among estimated amounts of storage of the specific component in the at least two portions of the NOx storage-reduction catalyst.

24. The exhaust gas purification method according to claim 23, wherein the specific portion of the NOx storage-reduction catalyst is a portion that has a lower rate of release of the specific component during execution of the regeneration operation than another portion of the NOx storage-reduction catalyst.

* * * * *